United States Patent [19]

Bales et al.

[11] Patent Number: 5,182,751
[45] Date of Patent: Jan. 26, 1993

[54] SWITCHING SYSTEM USING IDENTICAL SWITCHING NODES

[75] Inventors: Bruce M. Bales, Louisville; Robert L. Crumpley, Westminster; Sandra S. North, Golden; Stephen M. Thieler, Boulder, all of Colo.

[73] Assignee: AT&T Bell Laboratories, Murray Hill, N.J.

[21] Appl. No.: 636,521

[22] Filed: Dec. 31, 1990

[51] Int. Cl.[5] .................................................. H04J 3/12
[52] U.S. Cl. .................................. 370/110.1; 370/60; 370/94.1
[58] Field of Search .................... 370/110.1, 94.1, 60

[56]     References Cited
       U.S. PATENT DOCUMENTS

| 4,656,623 | 4/1987 | Dalby, Jr. et al. | 370/60 |
| 4,720,854 | 1/1988 | Sand | 370/60 X |
| 4,764,919 | 8/1988 | Hunter et al. | 370/60 |
| 4,988,209 | 1/1991 | Davidson et al. | 370/58.1 |
| 5,023,868 | 6/1991 | Davison et al. | 370/62 |
| 5,036,535 | 7/1991 | Gechter et al. | 379/210 |
| 5,062,103 | 10/1991 | Davidson et al. | 370/58.1 |

OTHER PUBLICATIONS

J. C. Borum, "The 5ESS Switching System: Hardware Design", *AT&T Technical Journal*, vol. 64, No. 6 Part 2 (Jul.-Aug. 1985) pp. 1417–1437.

*Primary Examiner*—Douglas W. Olms
*Assistant Examiner*—Russell W. Blum
*Attorney, Agent, or Firm*—John C. Moran

[57]     ABSTRACT

A switching architecture with identical switching nodes having a topology which allows for multiple paths between any two endpoint switching nodes without intervening switching nodes being involved in call control on those paths. This architecture is made feasible by a new type of link, the flexible rate interface (FRI) link. The FRI link has its own signaling channel distinct from the signaling channel of a standard link and is transparent to intervening switching nodes. Only endpoint switching nodes are aware of the existence of the FRI link with respect to call control. A standard protocol is utilized on the signaling channels of both the standard link and the FRI link. Advantageously, the standard link may be an ISDN link and the standard protocol may be the ISDN protocol. An FRI signaling channel of the FRI link may be established by using any of the following: a B channel of a standard ISDN link, standard ISN user information transport facilities, or a logical link of a D channel of a standard ISDN link. In combination with the FRI signaling channel, the FRI link may utilize B channels from a number of standard ISDN links for FRI B channels.

52 Claims, 12 Drawing Sheets

SWITCHING SYSTEM USING IDENTICAL SWITCHING NODES

TECHNICAL FIELD

This invention relates to a communication switching system having plurality of switching nodes.

BACKGROUND OF THE INVENTION

In prior art switching systems comprising a plurality of identical switching nodes, an originating switching node must set up each individual call to a destination switching node via an intervening switching node by involving the intervening switching node in each call control operation such as initiation, progress and termination of calls. One problem with such architecture is that the intervening switching node is substantially performing the same amount of call processing work as the originating switching node and the designation switching node; consequently, the number of calls that can be handled by the intervening switching node is limited. A second problem is that the propagation delay of signaling information for call control is greatly increased because of the need to process that information in the intervening switching node. The effect of these two problems is intensified if more than one intervening switching node is between the originating switching node and designation switching node. Because of these two problems, the prior art architecture of switching systems has not been able to utilize networks of identical switching nodes efficiently, but has been limited to switching nodes interconnected via special purpose hardware (either special purpose switching nodes, e.g., No. 4 ESS, or special center stage switching units, e.g., No. 5 ESS or AT&T Definity Telecommunication Switching System). The prior art has only used switching systems having a plurality of identical nodes when a small number of calls have been interconnected through an intervening switching node and the intervening switching node was also performing an overall switching system control function.

These prior art systems suffer from many problems. The first problem is the high cost of the special purpose equipment (switching nodes or special center stage switching units) and the inability to increase the number of customers served with a small incremental cost per customer as the number of customers increases. The second problem is that it is impossible to have one type of switching node capable of handling from 50 to 8000 customers. The final problem is the need to make the special purpose equipment very reliable since it is the only path between the switching nodes.

Further, the use of ISDN signaling does not provide a direct solution to these problems. ISDN signaling is initially defined by the ISDN standard Q.931 and is intended to provide an international standard to control the initiation of calls, progress of calls, termination of calls, communication of national use information, local serving network information, and user-specific information for telecommunications systems and terminals. The ISDN standard defines two standard links: (1) primary rate interface (PRI) links, each having 23 data channels (B channels) and one signaling channel (D channel), and (2) basic rate interface (BRI) links, each having two B channels and one D channel. The ISDN message format allows each message to have a number of information elements, IE, and groups IEs by codesets. There are eight possible codesets, numbered 0–7. Codeset Q is the current set of information elements and includes IEs that control the initiation, progress, and termination of calls.

In a system having a plurality of switching nodes, the problem with ISDN signaling is that each intervening switching node in the signaling path must process messages communicating the signaling information since each intervening switching node directly terminates the signaling channel. Each intervening switching node processes and interprets all IEs (codeset 0) relating to control of initiation, progress, and removal of calls. The propagation delay of signaling information is greatly increased because of the need to process that information in each intervening switching node, and a large additional processing load is placed on the intervening switching nodes.

SUMMARY OF THE INVENTION

The foregoing problems are solved and a technical advance is achieved by a switching architecture and method that use identical switching nodes having a topology which allows for multiple paths between any two endpoint switching nodes without intervening switching nodes being involved in call control on those paths. This new architecture is made feasible by a new type of link, the flexible rate interface (FRI) link. The FRI link has its own signaling channel distinct from the signaling channel of the standard link and is transparent to intervening switching systems. A standard protocol is utilized on the signaling channels of both the standard link and the FRI link. In a preferred embodiment, the standard link may be an ISDN link and the standard protocol may be the ISDN protocol.

Advantageously, the FRI signaling channel of the FRI link may be established by using any of the following: a B channel of a standard ISDN link, standard ISDN user information transport facilities, or a logical link of a D channel of a standard ISDN link. Also, the FRI link can utilize B channels for the communication of data from a number of standard ISDN links in combination with the FRI signaling channel. Only the endpoint switching nodes are aware of the existence of the FRI link with respect to call control.

In the preferred embodiment, the FRI link is established on a standard ISDN link which is terminated on an ISDN interface connected to a switching node. On the standard ISDN link, the signaling channel is communicated in a D channel of a standard ISDN link, and the transport channels are B channels of a standard ISDN link. A processor controlling the switching node sets up a FRI signaling channel on the standard ISDN link for use by the FRI link and establishes the ISDN standard protocol on that FRI signaling channel. Also, B channels from the standard ISDN link are reserved for use with the FRI link. The processor utilizes the FRI link and the standard ISDN link as two distinct links. The processor communicates signaling information on the FRI signaling channel to perform all call control on calls being set up or active on the transport channels assigned to the FRI link. The signaling information communicated on the FRI signaling channel is distinct from the signaling information of the signaling channel of the ISDN link which controls all calls on the unassigned transport channels of the ISDN link.

The processor executes a plurality of software layers arranged in a hierarchical structure. This structure processes signaling information for controlling a standard ISDN link in the following manner. The ISDN interface terminating the ISDN link is directly controlled by lower software layers. These lower software layers respond to signaling information received from the signaling channel of the ISDN interface to communicate the signaling information to an intermediate software layer (network software layer). The network software layer terminates the ISDN protocol and communicates information concerning the ISDN link with higher software layers. In contrast, the processor implements the FRI link by using an application software module in the highest software layer and a FRI interface software module that simulates the functions of the lower software layers. If the FRI signaling channel is being communciated by a B channel or a logical link of the D channel, the lower software layers respond to encapsulated information (conveying the FRI signaling channel) which is received via the ISDN link, to communicate that encapsulated information to the application software module. The latter module converts the encapsulated information into FRI signaling information and transfers the FRI signaling information to the FRI interface software module. The FRI interface software module transfers the FRI signaling information to the network software layer in the same manner as the lower software layers transfer signaling information from the signaling channel of the ISDN link to the network software layer.

When the network software layer has signaling information to transmit on the signaling channel of the ISDN link, the network software layer transfers the signaling information to the lower software layers which communicate the signaling information on the signaling channel of the ISDN link. However, when the network software layer has signaling information to be transmitted on the FRI signaling channel of the FRI link, the network software layer transfers the FRI signaling information to the FRI interface software module. The FRI interface software module receives the FRI signaling information in the same manner as the lower software layers but transfers the FRI signaling information to the application software module which encapsulates the FRI signaling channel information. The application software module transfers the encapsulated information to the lower software layers via the software hierarchical structure for transmission.

Other and further aspects of the present invention will become apparent during the course of the following description and by reference to the accompanying drawing.

DETAILED DESCRIPTION

System Architecture Overview

Figure 1:
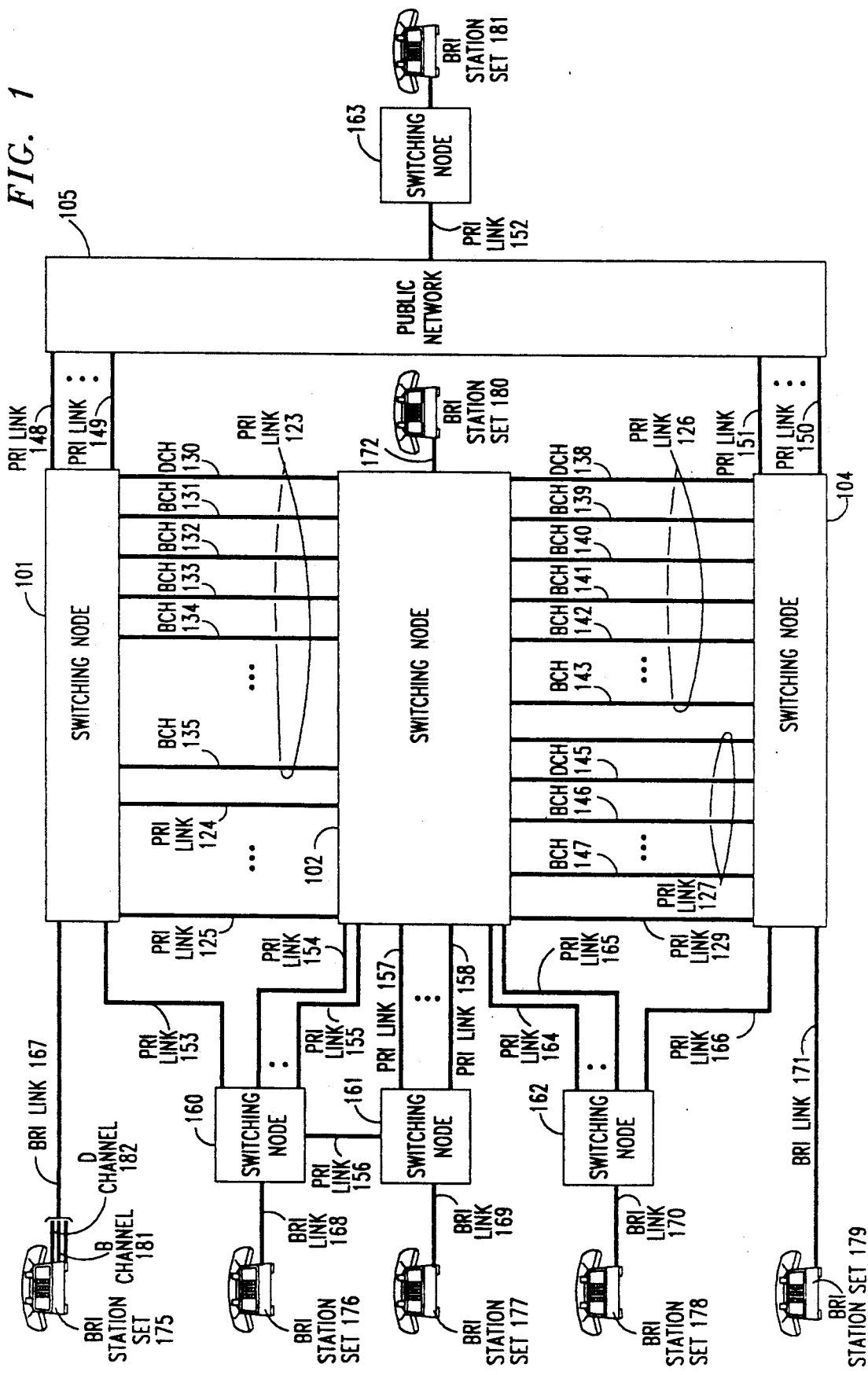
FIG. 1 illustrates, in block diagram form, a telecommunications switching system embodying the inventive concept.

FIG. 1 shows a communication system having a plurality of switching nodes with each of switching nodes 101, 102, 104, and 160 through 163 providing communications for a plurality of telephones, such as BRI station sets 175 through 181. The switching nodes are identical in accordance with the invention. Advantageously, the switching nodes of FIG. 1 function as an intergrated system to provide telecommunication services such as those provided by the AT&T Definity Generic 2 Communications System. Switching node 163 is interconnected to the other switching nodes via public network 105 and is providing telecommunication services to a group of people who are geographically remoted from the people served by the other switching nodes.

As illustrated in FIG. 1, the switching nodes and public network 105 are interconnected using a plurality of ISDN PRI links; however, ISDN BRI links could also be used for interconnecting switching nodes. Switching nodes 101 and 104 provide access to public network 105 via PRI links 148 through 149 and 150 through 151 for switching nodes 160 through 162. Switching node 102 provides the principal communication path between switching nodes 160 through 162 and switching nodes 101 and 104; however, alternate paths are provided by PRI links 153, 156, and 166, in case switching node 102 should fail. Communication paths may be set up between an originating switching node and a destination switching node via an intervening node by using one of two methods. The first method is to use standard ISDN signaling on the D channel of a PRI or BRI link to control each call. The second method, in accordance with the invention, uses ISDN signaling on the D channel of a flexible rate interface (FRI) link that is set up between an originating switching node and a destination switching node via an intervening node. With the use of the FRI link, the intervening node performs no call processing for individual calls. To illustrate these two methods of setting up communications paths from switching node 101 to switching node 104 via switching node 102 consider the two following examples.

Consider the following example of the first method using the D channels of PRI links to transport the signaling information for call control. In this example, switching nodes 101 and 104 are establishing a call between BRI station set 175 and BRI station set 179 via switching node 102. It is assumed, that B channel 135 of PRI link 123 and B channel 143 of PRI link 126 are utilized to establish the communication path. Switching node 101 is responsive to signaling information that identifies BRI station set 179 as the destination of a call, that information is received from BRI station set 175 via D channel 182 of BRI link 167. Switching node 101 responds to the signaling information received via BRI link 167 to exchange ISDN protocol messages via D channel 130 with switching node 102. In turn, switching node 102 exchanges similar messages with switching node 104 via D channel 138 of PRI link 126. Finally, switching node 104 exchanges messages with BRI station 179 via BRI link 171. If BRI station set 179 is capable of accepting the call, switching node 104 negotiates with switching node 102 to use B channel 143 of PRI link 126 for communication of this call. In addition, switching node 102 is responsive to the feedback from switching node 104 to negotiate with switching node 101 to use B channel 135 for communication of the call. After the establishment of the call path, switching node 104 transmits to BRI station set 179 call alerting and call setup messages. Switching node 104 then informs switching node 101 via transmission of signals on D channel 138 and D channel 130 via switching node 102 when BRI station set 179 is being alerted. In response to the alerting of BRI station set 179, switching node 101 provides the appropriate feedback to BRI station set 175. Once BRI station set 179 answers the call, switching node 104 establishes a path through its internal network between B channel 143 and a B channel of BRI link 171. Further, switching node 104 signals switching node 102 via D channel 138 that BRI station set 179 has answered the call. In response to this information, switching node 102 establishes a path through its internal network between B channel 135 and B channel 143. In addition, switching node 102 signals switching node 101 via D channel 130 that BRI station set 179 has answered the call. In response, switching node 101 establishes a path through its internal network between B channel 135 and a B channel of BRI link 167. This example illustrates that switching node 102 is performing a similar amount of work in establishing such a call as switching nodes 101 and 104.

For a small number of calls between switching nodes 101 and 104 via switching node 102, the first method of establishing call paths is adequate; however, when the number of calls increases coupled with additional calls from switching nodes 160 through 162, switching node 102 is unable to provide the amount of processing needed to control these calls. This problem can not only occur when calls are being switch through switching node 102 but may also occur if high calling rate conditions occur between any of these switching nodes. For example, it is possible for a large volume of calls to be occurring between switching nodes 162 and 163.

In accordance with the invention, these problems are resolved by the second method which establishes FRI links between end point switching nodes via intervening switching nodes. Consider the following example of the second method, where a FRI link is established between switching node 101 and switching node 104 via switching node 102. For this example, assume that the FRI link utilizes B channel 131 and B channel 139 of PRI links 123 and 126, respectively, for the FRI D channel and that the first FRI B channel utilizes B channels 132 and 140 and that the second FRI B channel utilizes B channels 133 and 141. In accordance with the invention, after the FRI link has been established, switching nodes 101 and 104 interact with this FRI link in the same manner as a PRI link or BRI link from the point of view of call establishment, control and maintenance.

During the initization of the FRI link, switching node 102 interconnects B channels 131 and 139, B channels 132 and 140, and B channels 133 and 141 under control of the appropriate control information from switching nodes 101 and 104. Switching node 102 is unaware of the fact that a FRI link has been created utilizing the latter B channels. In addition, during the initialization of the FRI link, switching nodes 101 and 104 establish a standard signaling channel on the FRI D channel which comprises B channel 131 and B channel 139 in the same manner as a signaling channel is established on D channel 130 of PRI link 123 during the initialization of the PRI link 123.

Consider now how a call is set up from BRI station set 175 to BRI station set 179 via switching nodes 101 and 104 and the FRI link using the second method. For this example, it is assumed that the first FRI B channel which is communicated on B channels 132 and 140 is utilized for this call. Switching node 101 responds to signaling information from BRI station set 175 that identifies BRI station set 179 as the destination. The signaling information is received from BRI station set 175 via D channel 180 of BRI link 167. Switching node 101 is responsive to that signaling information to exchange standard ISDN protocol messages via the FRI D channel, which is communicated on B channels 131 and 139, with switching node 104. Switching node 102 performs no call processing on the ISDN protocol messages that are being communicated on the FRI D channel. In response to those messages, switching node 104 transmits to BRI station set 179 messages via the D channel of BRI link 171 to determine if BRI station set 179 is capable of accepting the call. If BRI station set 179 is capable of accepting the call, switching node 104 negotiates with switching node 101 the use of the first FRI B channel. After the establishment of the call path using the first FRI B channel, switching node 104 transmits to BRI station set 179 call alerting and call setup messages. Switching node 104 then informs switching node 101 via transmission of signals on the FRI D channel when BRI station set 179 is being alerted. In response to the alerting of BRI station set 179, switching node 101 provides the appropriate feedback to BRI station set 175. Once BRI station set 179 answers the call, switching node 104 establishes a path through its internal network between B channel 140, which is communicating the first FRI B channel to switching node 104, and a B channel of BRI link 171. Further, switching node 104 signals switching node 101 via the FRI D channel that BRI station set 179 has answered the call. In response, switching node 101 establishes a path through its internal network between B channel 132, which is communicating the first FRI B channel to switching node 101, and a B channel of BRI link 167.

In accordance with the invention and as illustrated in FIG. 1, FRI links are set up between switching nodes 160 through 162 and switching nodes 101 and 104 via switching node 102. For example, a FRI link is set up from switching node 160 to switching node 104 by utilizing B channels from PRI link 154 and B channels from PRI link 129. One B channel of PRI link 154 and one B channel PRI link 129 are utilized as the FRI D channel and pairs of B channels from these PRI links are utilized for each FRI B channel. Similarly, a FRI link is established from switching node 163 to switching node 160 via public network 105 switching node 101, and switching node 102. Such a FRI link functions in the same manner as the FRI link described between switching node 101 and switching node 104. Public network 105 and switching nodes 101, and 102 perform no call processing of the signaling information being communicated on the FRI D channel.

With respect to the example where a FRI link was established between switching node 101 and switching node 104 via switching node 102, initially this FRI link consisted of two FRI B channels. However, the FRI link is not limited to this number of B channels. Further, it is not necessary that the B channels be part of the same PRI link as the B channel used to provide the FRI D channel.

Consider in greater detail the example of switching node 101 initializing the FRI link with switching node 104. First, switching node 101 negotiates with switching node 102 via the exchange of messages over D channel 130 for access to three B channels, which are assumed to be B channels 131 through 133. Switching node 101 accomplishes this by transmitting standard ISDN messages to switching node 102 to establish calls to switching node 104. Switching node 102 exchanges standard ISDN messages with switching node 104 via D channel 138 to establish the calls to switching node 104. When switching node 104 "answers", switching node 102 connects B channels 131 through 133 of PRI link 123 to B channels 139 through 141 of PRI link 126, respectfully. Switching nodes 101 and 104 then commence to establish the FRI D channel on B channels 131 and 139 and to identify B channels 132 and 140 as the first FRI B channel and B channels 133 and 141 as the second FRI B channel. Switching nodes 102 and 104 are responsive to signaling information received on the FRI D channel, which is communicated via B channels 131 and 139, to treat this signaling information in the same manner as it would signaling information received on D channels 130 or 138 from switching node 102. Once the FRI link has been established between switching node 101 and switching node 104, the latter switching nodes treat the FRI link as if it was equivalent to a PRI or BRI link directly interconnecting them.

Software Architecture

Figure 2:
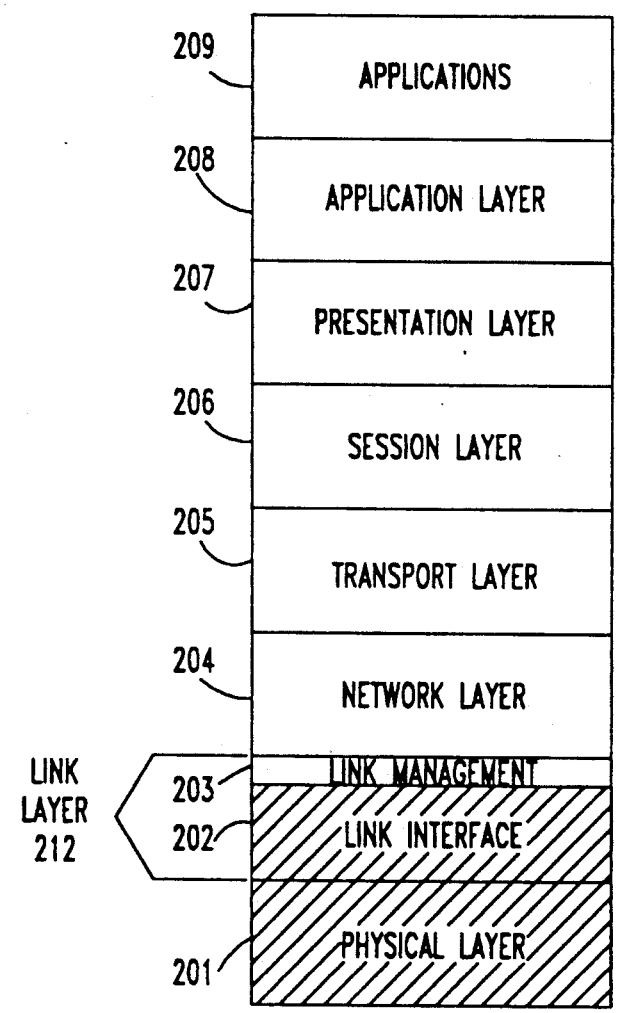
FIG. 2 illustrates a software architecture in accordance with the invention.

FIG. 2 illustrates the software architecture of the switching nodes of FIG. 1. This architecture is based on the conventional OSI model modified to implement the ISDN protocol. In accordance with the invention as described herein, certain further modifications have been made to the standard model in order to accomplish the expansion of ISDN capabilities to include the FRI capabilities of the invention. Looking ahead, it will be seen that encapsulated FRI D channel information communicated on a packetized B channel enters the software structure at a low software layer and is immediately communicated to the highest software layer, where the FRI D channel information is recovered and reinserted into an intermediate layer that processes all D channel information. By reinserting the FRI D channel information, the various functions controlling the FRI link can be carried out by higher software layers in a transparent manner that is the same as if those software layers were processing D channel information from a PRI or BRI link. Similarly, D channel information from those software layers for the FRI D channel is transferred from the intermediate software layer to the highest software layer which encapsulates it and communicates the encapsulated FRI D channel information to the low software layer for transmission on the packetized channel.

In order to lay the groundwork for these operations, it is useful to describe the various software layers of the software architecture.

The principal function of physical layer 201 is to terminate physical links. Specifically, physical layer 201 is responsible for maintaining physical channels and for controlling physical subchannels thereon. Physical layer 201 comprises a software portion and physical interfaces. Further, the software portion of physical layer 201 is responsible for the direct control of the physical interfaces to which physical links communicating PRI and BRI information terminate. Physical layer 201 presents to link layer 212 physical subchannels and physical channels as entities controllable by link layer 212.

The primary function of link layer 212 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 212 and physical layer 201. (An example of this type of protocol is the LAPD packet protocol used in ISDN Q.921. In the ISDN standard, link layer 212 terminates the LAPD protocol.) Link layer 212 can support multiple protocols so that the upper layers are uneffected by the different protocols being utilized. Further, link layer 212 allows higher software layers to control physical layer 201 in an abstract manner.

As seen in FIG. 2, link layer 212 is divided into link interface 202 and link management 203. The reason for this division is set forth herein below. It will be helpful at this point to discuss the communication of ISDN signals over a D channel to help readers, for example, who have only a rudimentary knowledge of the communication of ISDN signals over a D channel. At link layer 212, a plurality of logical links is established on a D channel. Only one of these logical links communicates ISDN control signals, and this logical link is referred to herein as a logical D channel (LDC). The LDC is identified by a logical D channel number (LDCN). In the previous example, it was the LDC of D channel 182 that switching node 101 used to control BRI station set 175. The other logical links within a D channel have other uses which are explained in connection with FIG. 4.

Link interface 202 does the majority of the functions performed by link layer 212, including the establishment of the logical links. Link management 203 identifies the various link interfaces for higher software layers. Further, link management communicates information between the logical links and higher software layers.

Network layer 204 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via PRI link 125, network layer 204 of switching node 101 negotiates with its peer layer (the corresponding network layer 204 in switching node 102) in order to obtain allocation of a B channel in PRI link 125—a procedure later to be repeated if a second B channel is desired. This negotiation is carried out using standard ISDN Q.931 messages such as the call setup and connection messages via the LDC set up on the D channel of PRI link 125. Network layer 204 identifies all B channels of given interface with the LDC for that interface. Network layer 204 is only concerned with the establishment of a call from one point to another point (e.g., node to node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 204 receives information from another node concerning a call via a LDC. As information is received on the LDC, a call reference number is utilized to identify the call associated with this message. The call reference number is selected by the originating network layer during call set up in accordance with the ISDN standard. Details of this identification are given with respect to FIG. 4.

Transport layer 205, is the key element that allows the routing of a call through a complex system having multiple nodes as illustrated in FIG. 1. Its primary function is to manage the routing of calls externally, i.e., between switching nodes. Transport layer 205 views the system of FIG. 1 in terms of nodes and is concerned with routing calls from its own node to other nodes or endpoints. (As explained in the detailed discussion of session layer 206, that layer, not transport layer 205, interprets logical destination information, such as a telephone number, to determin the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 205 is the first layer that starts to take a global view of the overall system illustrated in FIG. 1. Transport layer 205 uses information provided by session layer 206 to select the inter-node path. The transport layer performs its task of routing between various nodes by the utilization of tables defining the available paths and the options on those paths.

Communication between transport layers is done by network layer 204 using established LDCs. Transport layer 205 communicates information destined for its peers to network layer 204, and network layer 204 packages this information within the information elements, IES, of standard ISDN Q.931 messages. Network layer 204 uses the LDC that has been set up to a particular node to communicate this information to its peer network layer. Similarly, when another network layer receives information of this type, the other network layer unpackages information and then directs the information to the transport layer.

The primary function of session layer 206 is to establish communication among endpoints with all endpoints considered to be applications including, for example, a BRI telephone. Significantly, in the present context these endpoints are applications such as the application performing the call processing features. In any event, connections between such endpoints is considered to be a call. A session is set up by session layer 206 any time two applications require communication with each other. As noted earlier, session layer 206 deals only in terms of switching nodes and applications on those switching nodes and relies on transport layer 205 to establish paths to other switching nodes. Session layer 206 identifies the called application by an address which previously in telecommunication was thought of as only a telephone number but has a much broader concept in the Q.931 protocol. From the address, session layer 206 determines the destination switching node. Session layer 206 sets up a call to the destination switching node by communicating with the session layer of the destination switching node. The communication with the other session layer is accomplished by having the session layer request its transport layer to place a call to the other switching node so that a connection can be made for a particular address. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 207 of FIG. 2 invokes a complex protocol in order to groom the information being communicated between applications so that the applications are totally divorced from the protocol used to communicate the information. A presentation level protocol allows an application to communicate with a peer application across a transport path.

Finally, application layer 208 manages the resources needed by the applications running at layer 209. When an application at level 209 is communicating with another peer application, the application is unaware of how many other applications exist or where these other applications are located. It is the function of application layer 208 to determine and use such details, consequently allowing the applications to be written in a very abstract manner. At applications layer 209, thus far two applications have been discussed: the connection manager application and the call processing application.

FRI Software Architecture
Implementation—Overview

Figure 3:
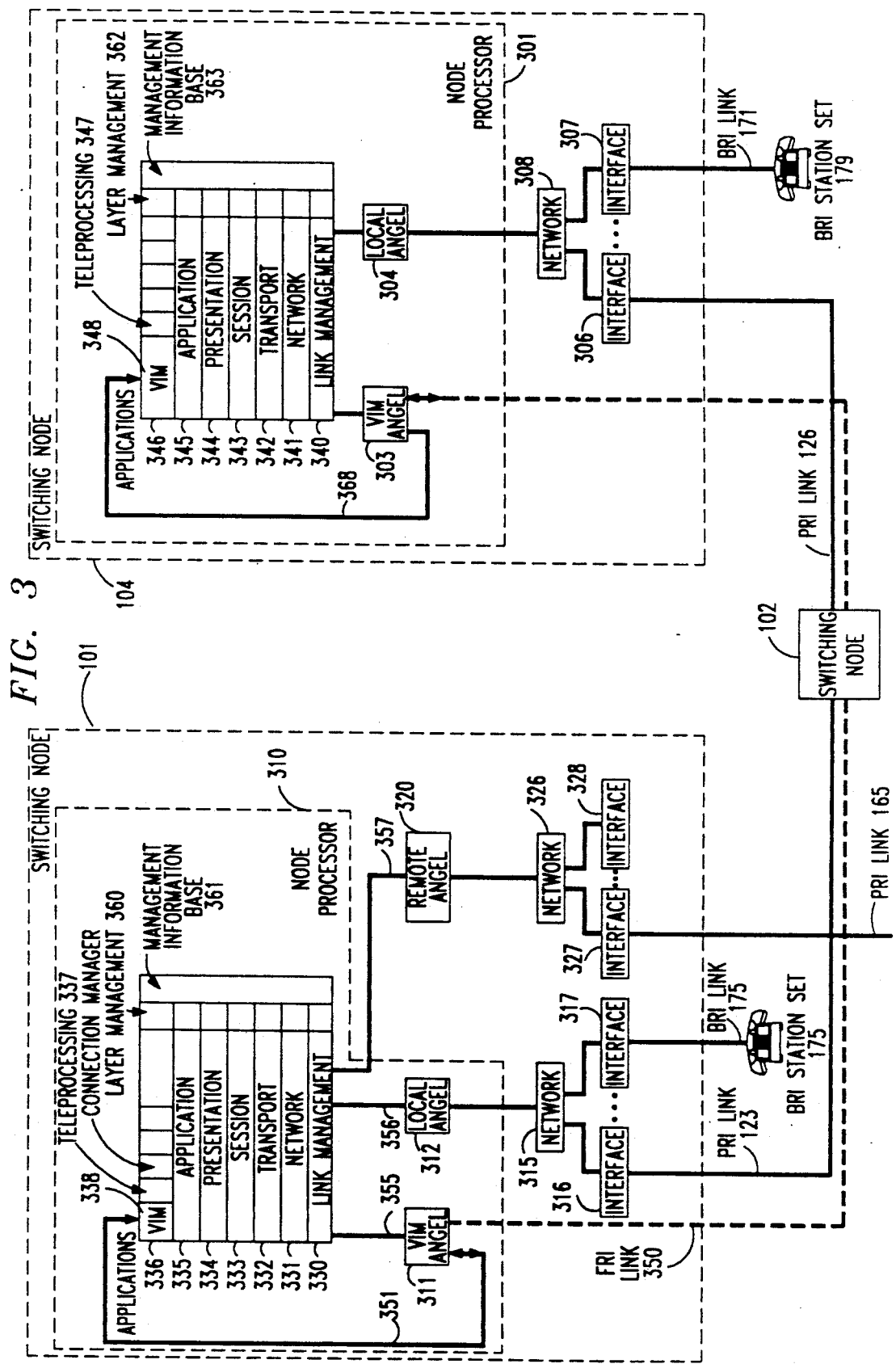
FIG. 3 illustrates, in block diagram form, the relationship between the software architecture and hardware elements illustrated in FIG. 1.

FIG. 3 illustrates in block diagram form the software architecture of FIG. 2 as implemented on switching node 101 and 104. This software architecture in accordance with the invention supports not only standard ISDN links but also FRI links. Software layers 203 through 209 are implemented on a main processor of each switching node, such as node processor 310 of switching node 101 and node processor 301 of switching node 104. Specifically, the software layers down through the link management portion of the link layer are realized by software layers denoted 336 through 330 in node processor 310 and software layers denoted 346 through 340 in node processor 301.

The link interface portion of the link layer is implemented by a number of separate software modules, each performing a link interface function. Each of these software modules is referred to as an "angel". These angels perform most of the functions of the link layer; and it is the task of the link management portion to simply provide a gateway, or interface, from the various angels to the upper layers of the software structure. The link interface in node 101 is implemented by local angel 312, Virtual Interface Manager (VIM) angel 311, and remote angel 320. Local angel 312 and VIM angel 311 are software modules executed by node processor 310. Remote angel 320 is a stand alone processor. The operation and purposes of remote angel 320 are described in detail in our copending U.S. patent application, Ser. No. 636,528, of B. M. Bales, et al., filed of even date herewith and entitled "Transparent Remoting of Switch Network Control over a Standard Interface Link". Correspondingly, the link interface in node 104 comprises local angel 304 and VIM angel 303.

The physical layer is jointly implemented by hardware and software. Specifically, the hardware portion of the physical layer for switching node 101 is implemented by interfaces 316 through 317 and interfaces 327 through 328. The software portion of the physical layer for interfaces 316 through 317 is performed by local angel 312 and for interfaces 327 through 328 by remote processor 320. For the FRI link, VIM angel 311 performs the software portion and simulates the hardware portion. Interfaces 316 through 317 and 327 through 328 are BRI and/or PRI interfaces of well-known types. Networks 315 and 328 perform the required switching functions under control of local angel 312 and remote processor 320, respectively.

In particular, interface 316 is associated with PRI link 123 and packetizes B channel 131 of FIG. 1 which communicates the FRI D channel is transferred by interface 316 via network 315 and local angel 312 to software layer 336 for further processing, as described in detail herein below. Although not explicitly indicated in FIG. 3, B channels 132 and 133 of FIG. 1 (the two FRI B channels) are directly switched by network 315 through the switching node and out to, for example, BRI station set 175 along the lines described above.

At switching node 104, the hardware functionality of the physical layer is carried out by interfaces 306 through 307. Just as in switching node 101, interface 306 transfers packetized B channel 139 which communicates the FRI D channel via local angel 304 to software layer 346 for further processing.

Turning now, to an important feature of the invention—the manner in which the FRI capability is built into the system—it is first desirable to describe briefly, and in somewhat simplified detail, how signaling is established on a standard ISDN link and the problems of establishing signaling on an FRI link. After understanding the problems of establishing signaling on the FRI link, a brief description is given of how a standard ISDN link is initialized with respect to the software layers and then how the FRI link is initialized.

During the previous discussion of link interface layer 201 and physical layer 202, it was described how these two layers function together to establish logical links on packetized ISDN D or B channels. Link management software layer 203 identifies these logical links and communicates information to or from one of the logical links with any designated higher software layer. The designation of the higher software layer occurs when the logical link is initialized. For example on a D channel of a standard ISDN link, one specific logical link (referred to as a logical D channel, LDC) is always designated to be communicated with network software layer 204 in accordance with the ISDN specification. The LDC communicates all call control information for the B channels of the standard ISDN link and is integral part of the ISDN specification.

We come, now, to the crux of the problem. Since it is desired to have the network and higher layers process the data on the FRI D channel in just the same way that it process the data on any other D channel controlling associated B channels, one might think that this would be a simple matter of indicating during channel set up to local angel 312—which handles standard D channels—that a logical link of the packetized B channel is to be passed up through to the network layer for LDC processing. Things are not so simple, however, because the network and higher software layers perform all call processing based on the concept that all B channels of a ISDN link are controlled by the LDC of that link. These B channels are identified with the LDC during the initialization of the ISDN link well before the setup of the FRI link. For the network and higher software layers to later reassign B channels from the LDC of an existing ISDN link to the LDC of the FRI link would require a deviation from the ISDN standard with respect to the functions performed by software above link management 203. Further, this reassignment would require communication between two network layers which is another deviation from the ISDN specification. Further, such negotiations are not possible if there is an intervening switching system such as another switching node or public network 102. For example, those network layers could be in switching nodes. The problem then is (1) to identify the FRI D and B channels of an FRI link to the network and higher software layers in the same manner as a standard ISDN link, (2) to correlate the FRI D and B channels with physical B channels communicating the FRI D and B channels oblivious to the network and higher software layers, and (3) to allow the network and higher software layers to control intra-node switching of the FRI B channels in the same fashion as switching B channels of a standard ISDN link.

This problem is solved, in accordance with a feature of the invention, via use of the Virtual Interface Manager alluded to above. The Virtual Interface Manager, or VIM, is a software package which includes both link layer software and application software. The link layer software is, in fact the aforementioned VIM angel 312 in node processor 310 and its counterpart in node processor 301—VIM angel 303. (The link layer software was also referred to earlier as the virtual interface software module.) VIM angels 311 and 303 also simulate the physical layer. The application software is denoted in the FIG. 3 as VIM application 338 in node processor 310 and VIM application 348 in node processor 301. The general solution to the problem with specific reference to switching node 101 is as follows. During the setup of the physical B channels that provide the FRI link, local angel 312 is instructed to communicate the FRI LDC information from a logical link of the packetized channel to VIM application 338. In response, local angel 312 performs the same type of operations as it does in communicating the LDC information from a standard ISDN link to network layer 331. In turn, VIM application 338 instructs VIM angel 311 to simulate an FRI link becoming active in order to inform the higher software layers that a new LDC has become active with a certain number of B channels. Once the FRI link has been identified to the higher software layers by the VIM angel 311, the FRI link is operational.

In operation, as FRI LDC information is received by VIM application 338 from the packetized B channel, VIM application 338 transfers this information to VIM angel 311. In response, VIM angel 311 transfers this information to link management layer 330 in the same manner as local angel 312 transfers information from a LDC of a standard ISDN link. When link management layer 330 receives LDC information for the FRI LDC, link management layer 330 transfers the information to VIM angel 311 in a conventional manner. In turn, VIM angel 311 transfers the information to VIM application 338. In response to the information, VIM application 338 communicates the information out on the packetized B channel.

When link management layer 330 receives information requesting that a control action be performed on one of the FRI B channels, this information is transferred to VIM angel 311 in the conventional manner which in turn transfers it to VIM application 338. VIM application 338 translates between the FRI B channel and the physical B channel that is actually communicating the FRI B channel and instructs the angel controlling the physical B channel to perform the requested control action.

To understand how an FRI link is initialized, first consider the initialization of a standard ISDN link. When a standard ISDN link becomes active, the physical layer identifies the physical interface terminating that link to the link interface software layer by a physical interface number. The link interface software layer establishes a packet protocol on the D channel and assumes that the LDC as being communicated by a pre-specified logical link of the D channel. The link interface software layer then informs the link management software layer that a new LDC is active, that it has a certain number of B channels, and that it is established on a certain interface. The link management software layer identifies this new LDC by its link interface software layer and informs the network software layer that a new LDC is active and that the LDC controls a certain number of B channels.

In response, the network software layer records the new LDCN existence and sets up tables to control the B channels as they become active. In addition, the network software layer informs the transport software layer that a new LDC is active and to what system entity the new LDC is connected. After both sets of software layers (e.g. software layers 330 through 336 and software layers 340 through 346) are initialized in this manner, calls may be established over the B channels associated with the LDC by the network software layers. Signaling information received or transmitted on the LDC is communicated between the network software layer and the link management software layer. In turn, the link management software layer communicates this information with link interface software layer for communication on the logical link of the D channel.

Consider how an FRI link is initialized with respect to the software layers. Once such an FRI link is established between switching node 101 and switching node 104, software layers 330 through 336 function as if FRI link 350 was a physical link and directly connects a portion of interface 306 (that portion controlling B channels 140 and 141) to VIM angel 311. Using the FRI LDC, software layers 330 through 336 control B channels 141 and 142 (as FRI B channels) in the same manner as if these channels were directed connected to an interface attached to network 315.

The first step in the initialization process is for VIM application 338 to place a call to VIM application 348; this call establishes a B channel between the two applications. VIM application 338 then requests that the link interface layer create a packetized channel on this B channel. All information received or transmitted on this packetized channel is communicated between VIM application 338 and the link interface of angel 312 via link management layer 330. VIM application 348 performs similar operations. VIM application 338 then requests that two more B channels be established between switching node 101 and switching node 104.

In the second step, VIM application 338 requests that VIM angel 311 inform link management 330 that an LDC has become active and that it has two B channels. (Herein, those channels are called FRI D and FRI B channels.) Recall that VIM angel 311 is performing the functions of the link interface software layer and simulating the physical layer. Software layers 330 through 336 process this information in the same manner as previously described for the standard link; hence, those software layers are unaware that a FRI link is different from a standard link. VIM application 338 maintains the correlation between the FRI channels and the physical channels that transport the FRI channels.

FRI Software Architecture Implementation—Detailed View

The following paragraphs describe in greater detail the manner in which the FRI LDC and the two FRI B channels are established between switching nodes 101 and 104. VIM application 338 performs one set of functions during the initialization of the FRI link and another set during normal operation of the FRI linking. During initialization, VIM application initiates and sets up the FRI link in conjunction with its peer VIM application, i.e. VIM application 348. During normal operation, VIM application 338 receives signaling information of the FRI LCDN from B channel 131, in the present example, via interface 316 network 315, local angel 312 and software layers 330 through 335. In response to this signaling information, VIM application 338 transfers it to VIM SFF 311 which presents the signaling information to link management 330 as of it was signaling information from a LCDN on a physical channel. VIM application 338 performs the reverse operation for signal information transferred to VIM angel 311 from link management 330.

Each node processor, in a system such as FIG. 1, has an administered telephone number which is only used for performing network setup functions. VIM application 338 uses the administered telephone number of node processor 301 to initially request that software layers 331 through 333 transmit a setup message with the telephone number in the called party number. By transmitting the setup message, VIM application 338 is placing a call to VIM application 348.

The setup message is transmitted in the LDC of the D channel of PRI link 123, which had previously been established when PRI link 123 was set up, to switching node 102. Switching node 102 processes this request in a normal manner with respect to both switching node 101 and switching node 104. The setup message requests a B channel, e.g., B channel 131 of the present example. After establishment of the FRI LDC on B channel 131, two more requests are made for two additional B channels. Switching node 102 communicates with switching node 104 via the LDC of D channel of BRI link 126. VIM application 348 answers this call, and messages are transmitted back and forth as if a human being had answered the call on a conventional telephone set. Initially, the setup message is transferred to network layer 341. Network layer 431 transfers the setup message to session layer 343 via transport layer 342. When the setup message is received, session layer 343 handles this call in the same manner as it would any other call. Session layer 343 is responsive to the telephone number to determine that it is directed to VIM application 348 as an end point and transfers the setup message to the application layer 345. Application layer 345 examines the dialed number in the called party number field and, based on that, transfers the call setup request to VIM application 348.

If VIM application 348 chooses to accept the call upon receipt of the call setup message, VIM application 348 transmits down to the lower software layers a request that a B channel be established and that an acknowledgment message be sent. In response, network layer 341 formulates a connection message that is then transferred back to node 101 via switching node 102. Network 341 also negotiates with switching node 102 for the B channel, e.g., channel 139. Switching node 102 is responsive to the connection message to interconnect B channel 131 to B channel 139, respectively. If VIM application 348 decides not to answer the message, then network layer 341 tears the call down by sending the proper messages to node processor 310 and switching node 102.

After requesting the transmission of the connection message, VIM application 348 transmits a request via link management 340. In response, link management 340 requests that local angel 304 control interface 306 so that B channels 140 and 141 become FRI B channels and B channel 139 is utilized as a packet channel. A software path from the packet channel is then interconnected through local angel 304 to link management 340. Link management 340 then establishes a mode 3 LAPD protocol on the packet channel. As described in greater detail with respect to FIG. 5, VIM application 348 then utilizes VIM angel 303 to inform software layers 340 through 346 that an virtual interface which is implemented by VIM angel 303 is being set up. Link management 340 responds to the virtual interface being set up by establishing and identifying FRI LDC of FRI link 350 as being provided by the packet channel of B channel 139.

After setting up B channel 131, VIM application 338 application requests that a second set up message be transmitted to interconnect B channel 132 to B channel 140 and B channel 133 to B channel 141 via switching node 102. The resulting two communication paths become FRI B channels.

In setting up the virtual interface, VIM application 348 maps the physical channel number (aintf) of interface 306 into the virtual channels numbers (sintf). In the present example, the packet channel of B channel 139 becomes a FRI D channel which is illustratively assigned the number 24. B channel 140 is mapped into FRI channel 1, and B channel 141 is mapped into FRI channel 2. Furthermore, link management 340 identifies virtual interface with a sintf and correlates this sintf with the VIM angel number and the aintf for the virtual interface. After this mapping and initialization of physical interfaces is completed, the FRI link is established between switching node 101 and switching node 104.

After the connection message is received back from switching node 104, VIM application 338 and VIM angel 311 perform the same functions as local angel 312 performs in notifying software layers 330 through 335 that a new interface has been set up. In response to the connection message, VIM application 348 sets up virtual interface using VIM angel 303 and transmits control information to local angel 304. In response, angel 304 initializes interface 306. In manner similar to VIM application 348, VIM application 338 maps and identifies virtual interface implemented by VIM angel 311 in order to establish the FRI link. Greater detail on setting up the FRI link is given with respect to FIG. 5. After the VIM applications and VIM angels in both node processors 310 and 301 have completed the execution of the functions described with respect to FIG. 5, the FRI link is established both from a hardware and software perspective between switching node 101 and switching node 104. At this point in the present example, there is no actual voice or data call currently active on this link. The manner in which an active call is established on the FRI link is described in detail in the next paragraph.

In accordance with the present example, at some point in time after the FRI link has been established between switching node 101 and switching node 104, a customer using BRI station set 175 connected switching node 101 via BRI link 167 and interface 317 places a call to BRI station set 179 connected to switching node 101 via BRI link 171 and interface 307.

As signaling information defining the called telephone number is received by switching node 101 from BRI station set 175 via the D channel of BRI link 167, that information is communicated to teleprocessing application 337. In response to this signaling information, teleprocessing application transmits down to session layer 333 a request to interconnect the call being received from BRI station set 175 to the telephone number associated with BRI station set 179. Session layer 333 translates the telephone number and searches the appropriate tables and finds that BRI station set 179 is associated with switching node 104. This searching is done by utilizing the information in management information base 361. Session 333 translates any telephone number to an endpoint, node or public network.

Session layer 333 transmits a request to transport layer 332 to determine the endpoint to which switching node 104 is connected. Transport layer 332 determines that the endpoint is FRI link 350. Transport layer 332 then transmits a request to network layer 331 to determine the sintf and channels of the FRI link 350. The LDC can be determined by transport layer 332, because node processor 310 associates with each LDC channel all the B channels for which each LDC provides signaling. Hence, by determining the LDC channel that is providing signaling for switching node 104, transport layer 332 has also determined all the B channels that can be used to transport voice or data to switching node 104. Network layer 331 is responsive to the request from transport layer 332 to negotiate with network layer 341 of node processor 301 for an available FRI B channel which will be the first FRI B channel that is communicated on B channels 132 and 140. Network layer 331 determines a B channel for transporting the call from a plurality of channels that are part of a FRI or PRI link; and negotiates via the FRI D channel.

Once the call has been set up via the first FRI B channel, transport layer 332 of node processor 101 identifies, in terms of the sintf, the physical channel used for BRI station set 175 and the virtual interface. Now, transport layer 332 requests through session layer 333 that the intra-nodal routing routine of connection manager application 351 establish a connection through switching node 101 to interconnect the interfaces for BRI station set 175 and switching node 104.

In order to set up a physical connection between the physical channels, transport layer 332 requests through session layer 333 that the intranodal routing routine of connection manager 351 determine the path through networks of switching node 101. The intra-nodal routing routine requests from VIM application 338 the mapping to establish that the first FRI B channel of FRI link 350 is terminated by physical interface 316 on B channel 332. The intranodal routing routine determines the physical interface and channel (interface 317 and B channel 181) associated with the call from BRI station set 175 because this information was stored by session layer 333 in management interface base 211 when this call was received. The communication between the intra-nodal routing routine and VIM application 338 is done at the application level and is not communicated through any of the lower layers.

After determining the actual physical interface channel and the fact that both of the physical interface channels (which are on interfaces 316 and 317) are controlled by local angel 312, the intra-nodal routing routine transmits a command to local angel 312 to cause network 315 to interconnect the appropriate B channels. The commands to the local angel 312 from the intra-nodal routing routine are sent out directly and are not processed by layers 335 through 330.

Transport layer 342 performs similar functions to those of transport layer 332 in order to establish a connection between B channel 140 of interface 306 and the proper B channel on interface 307 via network 308. Interface 307 terminates the BRI link 171 from BRI station set 179.

Figure 4:
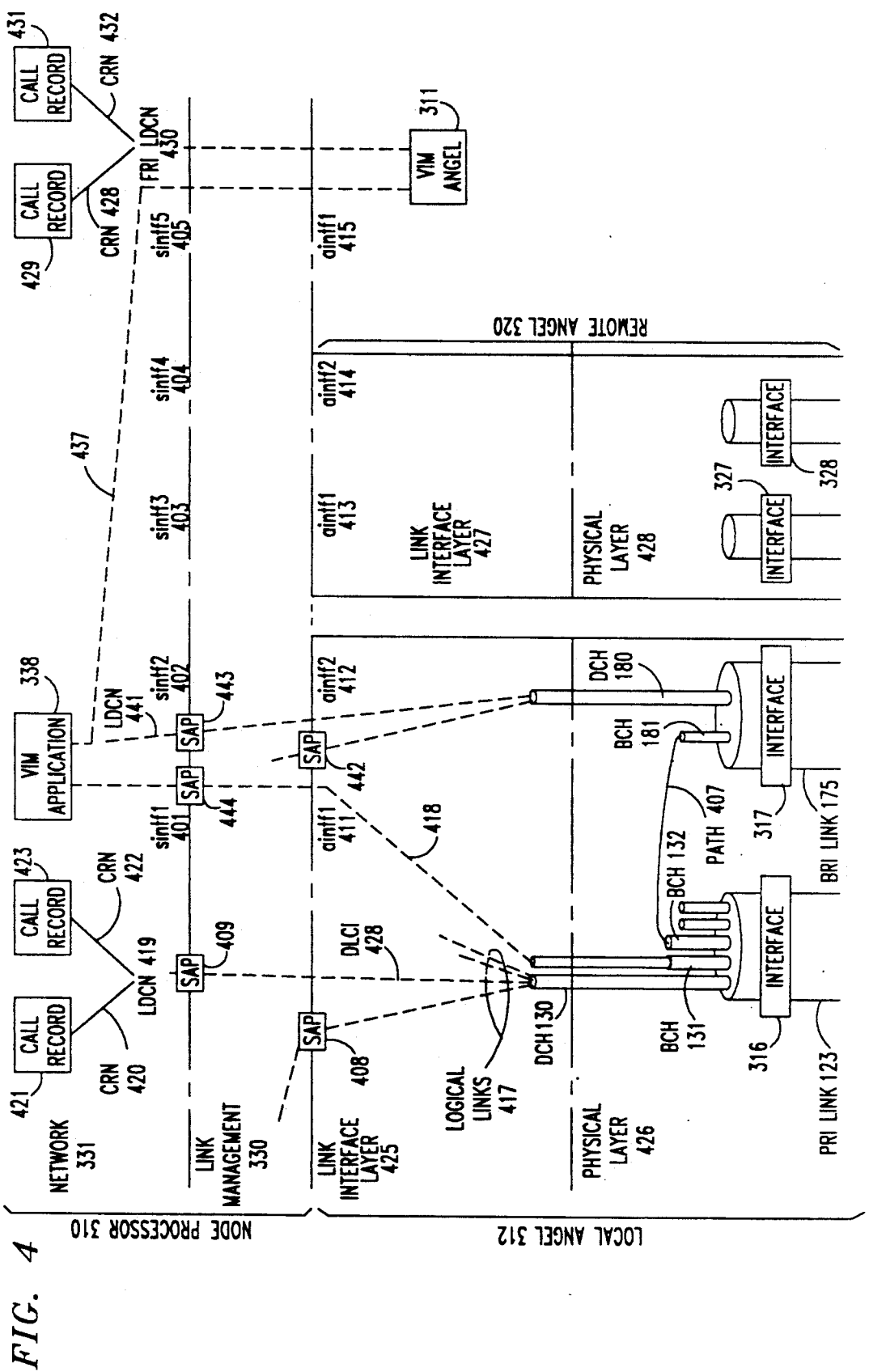
FIG. 4 logically illustrates the signaling and transport paths that are set up within a switching node.

FIG. 4 logically illustrates the general relationships between data link connection identifiers (DLCI), service access point identifiers (SAPI), terminal end identifiers (TEI), system interface numbers (sintf), switches angel interface numbers (aintf), logical D channel numbers (LDCN), call reference numbers (CRN), and the various software layers. As illustrated in FIG. 4, each pair link interface layers and physical layers is implemented on a different angels. Link interface layer 425 and physical layer 426 are implemented by local angel 312, link interface layer 427 and physical layer 428 are implemented by remote angel 320, and link interface layer 429 and physical layer 430 are implemented by remote angel 320. Node processor 310 implements link management 330, network 331, and higher layers. Sintf, switch and aintf numbers correlate to physical interfaces. The sintf numbers are utilized by network layer 331 and higher layers to identify physical interfaces. Network layer 331 views the physical interfaces as being identified by sintf1 401 through sintf6 406. Link management 330 makes a conversion between the sintf numbers and the switch and aintf numbers which together represent the physical interface. For example, link management 330 converts sintf1 401 to local angel 312 and aintf1 411. Link interface layer 425 utilizes aintf1 411 to identify physical interface 316. There is a one for one correspondence between sintf1 401 through sintf6 406 and aintf1 411 through aintf2 416.

The sintf and aintf numbers identify specific interfaces, and each interface has a number of channels. For example, PRI link 123 has 24 channels and BRI interface 317 has three channels. Network layer 331 identifies the channels associated with a particular sintf by using the actual physical channel numbers, and similarly, link interface layer 425 utilizes the physical channel numbers in association with an aintf number. This is possible because the specifications of the ISDN standard designate that physical channel 24 is used to perform signaling. Network layer 331 and higher layers utilize sintf numbers in order to control the link interface layers and physical layers to interconnect physical channels and to create specific protocols on these channels. The manner in which channels are interconnected through physical networks such as network 315 is not illustrated in FIG. 4 except in a logical manner, e.g. path 407.

Further, FIG. 4 logically illustrates the utilization of the various channels and the points at which these channels are terminated and at which information is utilized. As previously described, B channel 131 is a packetized channel, and B channel 132 of interface 316 is interconnected to B channel 181 of interface 317 by path 407. Path 407 is made through network 315. It would be obvious to one skilled in the art that similar paths could be made between B channels in interface 316 and 317. The circuit switching of B channels is performed at the physical layer; whereas, packet switching or frame relaying is performed at the link interface layer. The packetized channel of B channel 131 is terminated at link interface layer 425 which establishes a mode 3 protocol on this channel and receives and transmits information from and to VIM application 336 via path 418.

Figure 5:
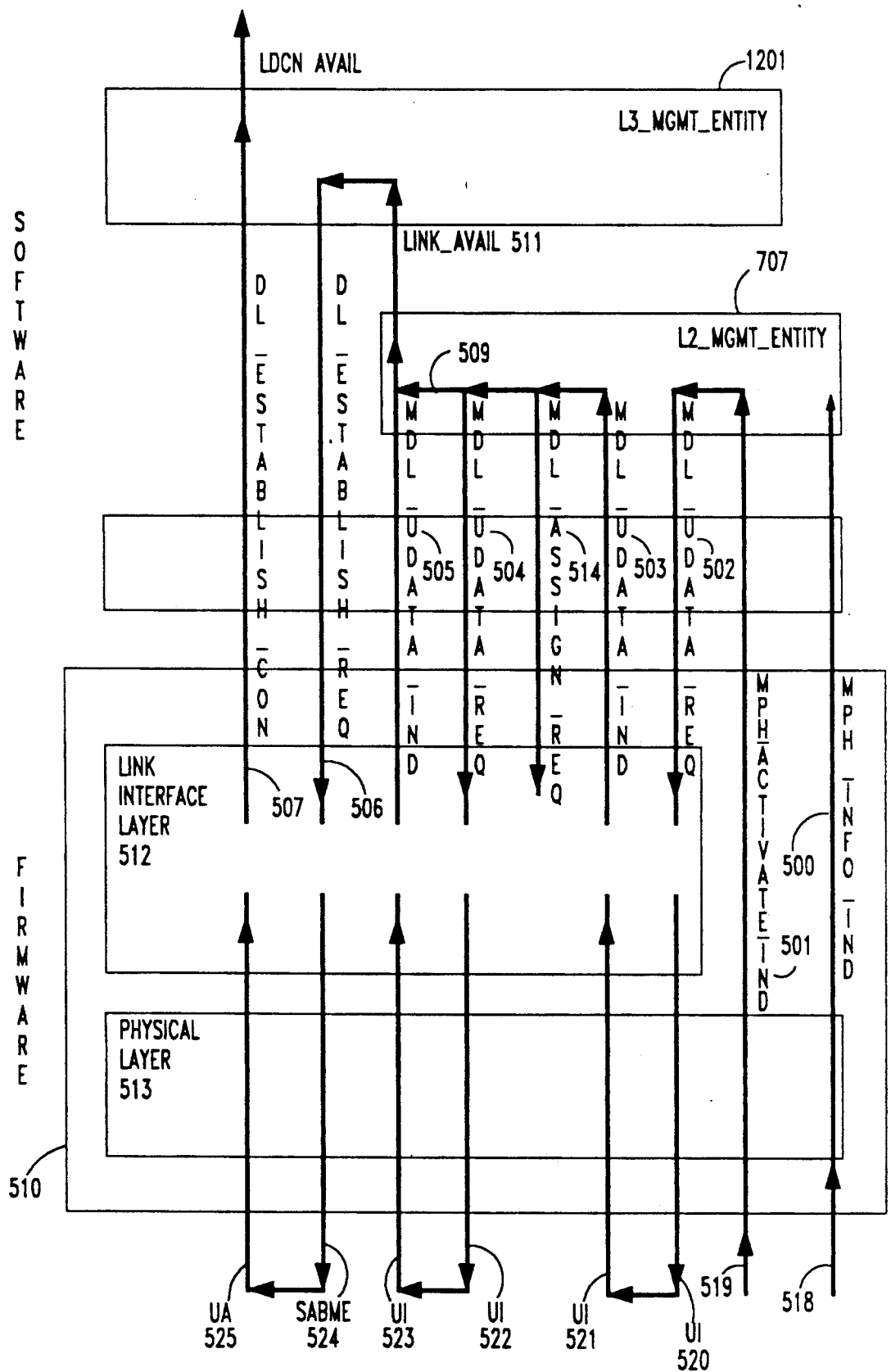
FIG. 5 logically illustrates a process for establishing a physical interface.

The manner in which a LDC is set up is described in greater detail with respect to FIG. 5 and is not repeated at this point. However, FIG. 4 illustrates the manner in which D channel 130 is subdivided so as to provide the necessary flow of information to implement a LDC. At physical layer 426, all channels are treated alike. First, link interface layer 425 under control of higher layers establishes a LAPD packet protocol on D channel 130 which is channel 24 of PRI link 123. The LAPD packet protocol creates a plurality of logical links 417 each of which is identified by a DLCI number such as DLCI 428. A DLCI number is based on the TEI and SAPI numbers with each pair of TEI and SAPI numbers designating one DLCI or logical link. The protocol allows for a 128 TEI numbers and 63 SAP numbers. D channel 180 is subdivided in the same manner as D channel 130.

In accordance with the ISDN specification, a physical link can be considered either as point-to-point or point-to-multi-point. By convention, a PRI link may only be point-to-point resulting in only one TEI number being allowed on the D channel of a PRI link. Further by convention, that TEI number is equal to 0. A BRI link may be point-to-point or point-to-multi-point resulting in a D channel of BRI potentially having more than one TEI number. In accordance with the ISDN specification, four of the SAPI numbers of a D channel are predefined as 0 for call control, 16 for implementing a X.25 protocol, 1 for a packet mode connection, and 63 for peer to peer communication between link management layers. In FIG. 4, SAP 408 has the value of 63 and is used by link management 330 for communication with its peer in the present example on switching node 102. SAP 409 has a value of 0 and is used to implement LDCN 419. In the present example, the SAPs having values of 16 and 17 are not implemented. The remainder of the 60 SAP values may be utilized to establish packet connections for the communication of data for software layers above network layer 331. SAPs 432 and 433 correspond to SAPs 408 and 409 in function.

All signaling is controlled via LDCN 419 for interface 316. Upon receiving a SAPI of 0 which is SAP 409, link management 330 directs this to network layer 331. In accordance with the ISDN specification, call reference numbers are included in the Q.931 protocol and are received via LDCN 419. These call references numbers are utilized to identify call records such as call record 421 or 423. For example, CRN 420 and 422 identify call record 421 and 423, respectfully. There is one call record for each channel or channel that is engaged in a circuit switched or packetized call on a physical interface. Link management 330 utilizes sintfl 401 to associate LDCN 419 with call records 421 and 423. At network layer 331, CRN numbers are only unique with respect to an individual LDCN. Although not shown in FIG. 4, CRNs and call records would also be associated with LDCN 431.

FIG. 5 illustrates the messages that are exchanged in bringing up an interface on switching node 101 of FIG. 3. The messages that are exchanged among the various levels for both VIM interfaces as well as physical interfaces are illustrated in FIG. 5. In the case of a physical interface, firmware 510, which includes link interface layer 512 and physical layer 513, is physically being implemented on either local angel 312 or remote angel processor 320 through 325. However, if virtual interface as implemented by VIM angel 311 is being brought up, firmware 510 is implemented by VIM application 338 and VIM angel 311.

First, consider FIG. 5 from the point of view of physical interface 316 of FIG. 3 which is being bought up. Initially as an interface is plugged in (path 518), physical layer transmits the mph_info_ind 500 primitive which is directed to L2_MGMT_ENTITY 707 (a level 2 management entity which is described in detail with respect to FIG. 7). Note, the service access point (SAP) number is a 63 for a MDL primitive and a zero for a DL primitive. Primitive 500 also includes the aintf which the angel selects. The aintf is the reference used by L2_MGMT_ENTITY 707 to refer to that interface. Primitive 500 also defines the type of interface, such as a PRI, BRI or FRI link, that has been brought up. Note, that the mnemonics indicate where the message is from and where it is going. MPH means that the message is between the physical layer and the level 2 management entity, MDL indicates that message is between the level 2 management entity and the LAPD portion of link interface layer 512, and DL indicates that message is between level 3 and the LAPD portion of link interface layer 512.

When physical layer 513 detects framing (path 519) on the interface, physical layer 513 communicates this fact to entity 707 by the transmission of MPH_ACTIVATE_IND 501 primitive. To completely respond to primitive 501, entity 707 needs to establish with the other interface the terminal endpoint identifier (TEI). The TEI is determined through negotiations with the other interface. To accomplish this negotiation, entity 707 communicates with its peer level 2 management that is controlling the other interface. For example, assume that the indication on path 519 resulted from a BRI interface becoming active by a telephone being plugged into the BRI interface. Most BRI telephones are programmed to negotiate the TEI specified by the ISDN standard in response to Q.921 messages received via the BRI interface. If the active interface is not a BRI interface which supports the automatic TEI procedures, primitives 502 and 503 are not exchanged. Entity 707 starts the TEI negotiation by sending the MDL_UDATA_REQ 502 primitive that contains a TEI selected by entity 707 to layer 512. In response, layer 512 transmits UI 520 (unnumbered frame). The peer entity responds to UI 520 via its interface with UI 521 that contains an indication of the peer entity's agreement with TEI selected by entity 707. In response to UI 521, link interface layer 512 inserts the indication into MDL_UDATA_IND 503 primitive. The CCITT ISDN specification allows for other commands at this point that allow for further negotiation of the TEI if entity 707 selected a TEI that was already being used by the telephone.

Entity 707 responds to primitive 503 by transmitting MDL_ASSIGN_REQ 714 primitive to link interface layer 512. This primitive contains information requesting that link interface layer 512 make an allowance for every possible SAPI identifier that can be associated with the negotiated TEI. As explained with respect to FIG. 4, the SAPI defines how a logical link is being used; whereas, the TEI simply identifies a terminal on the other side. The request for link interface layer 512 to make allowance for SAPI identifiers makes provision for entity 707 to establish these SAPI identifiers at a later point.

Now, entity 707 transmits a MDL_UDATA_REQ 504 primitive whose information contains the address of a specific TEI and the node number of node 101. Primitive 504 is converted by layer 512 to UI 522. The reason for sending the node number using primitive 504 is to determine whether the other peer entity is on a switching node such as switching node 101. The other entity may also be on a public network or a BRI telephone. In response to UI 522, if the other entity is on a node, it responds with its node number by the transmission of UI 523 whose information includes the other entity's node number. Layer 512 responds to UI 523 by transmitting MDL_UDATA_IND 505 primitive. If the other entity is not a node, it fails to recognize UI 522 and does not respond, resulting in a time out. In response to the time out, entity 707 via path 509 communicates LINK_AVAIL 511 primitive to entity 1201 which is described in greater detail with respect to FIG. 11. At this point, entity 707 has accomplished the following functions: framing has been established, the TEI has been identified, link interface 512 has been advised to prepare for the establishment of different services via SAPI identifiers such as signaling, an attempt has been made to exchange node numbers, and the determination has been made that the interface is now ready to be used by higher layers. Entity 707 now advises entity 1201 via the LINK_AVAIL 511 primitive that the interface is now ready for use and whether or not the interface is a switching node.

Entity 1201 has to determine whether to establish a signaling link with the other entity. If entity 1201 already has a signaling link to the other peer entity in another switching node, entity 1201 does not precede with primitives 506 and 507. Entity 1201 has a signaling link with the other entity if the switching node of the other peer entity has an established interface with switching node 101. If entity 1201 needs to establish signaling, entity 1201 transmits a DL_ESTABLISH_REQUEST 506 primitive which contains information requesting that a signaling link (LDC) be established to the other entity. Layer 512 converts primitive 506 to SABME 524. If the other entity agrees, it transmits UA 525 back which layer 512 converts to DL_ESTABLISH_CON 507 primitive. After receipt of primitive 507, entity 1201 transmits a LDCN_AVAIL message to transport layer 332 advising the transport layer that a new LDC has become available. In addition, the LDCN_AVAIL message also informs transport layer 332 whether the LDC is communicating with another switching node, central office, long distance network, a telephone, or an unidentified entity.

In forming the DL_ESTABLISH_REQUEST 506, entity 1201 uses the node number received in LINK_AVAIL 511 primitive to determine the position of the new node within the node system. Each node has a unique node number, and the number itself determines the position within the node system. In addition, this information is utilized to decide which entity is going to be the user or the network on a PRI interface. If this relationship is not correct on a PRI link, the link will not become operational. Before the transmission of DL_ESTABLISH_REQUEST 506, the signaling link has not yet been established so that the determination of user and network has not been made. Primitives 501 through 505 occur before any LAPD link is established. For this reason, all the frame commands are unnumbered. This frees the entities from having to determine the network and the user destinations. Before the transmission of primitive 506, entity 1201 compares the node numbers and from this comparison determines which of the entities will be defined the user or the network. For other entities such as the public network, this destination is specified. If the other entity is unknown with respect to being a network or a user, entity 1201 initially tries to come up as a user when transmitting out primitive 506. If this fails, entity 1101 determines this after a timeout period is exceeded. If a timeout occurred, entity 1101 then transmits out a second primitive 506 designating itself as the network.

The functions described with respect to FIG. 5 are now discussed specifically in relation to bringing up a FRI link between switching node 101 and switching node 104. First, VIM applications 338 and 348 negotiate the setting up of a LDC on D channels 130 and 138 interconnecting the VIM applications by placing a call between themselves. Using the LDC, VIM application 338 and VIM application 348 control B channels as previously described. As previously described, VIM applications 338 and 348 exchange node numbers or absences of node numbers during call set up. Once the peer-to-peer communication has been established between VIM applications 338 and 348, via the LDC on the D channels, these applications initialize their virtual interfaces as implemented by VIM angels 311 and 303 in order to set up FRI link 350 and to identify these interfaces to the appropriate software layers. This is described from the point of view of VIM application 338 but VIM application 348 performs similar functions. In initializing the virtual interface (as implemented by VIM angel 311) to bring up a FRI link, VIM application 338 must inform software layers 330 through 335 of the existence of the three channels forming the FRI link and how the three B channels are being utilized. In addition, VIM application 338 must set up a packetized data link on B channel 131.

Figure 6:
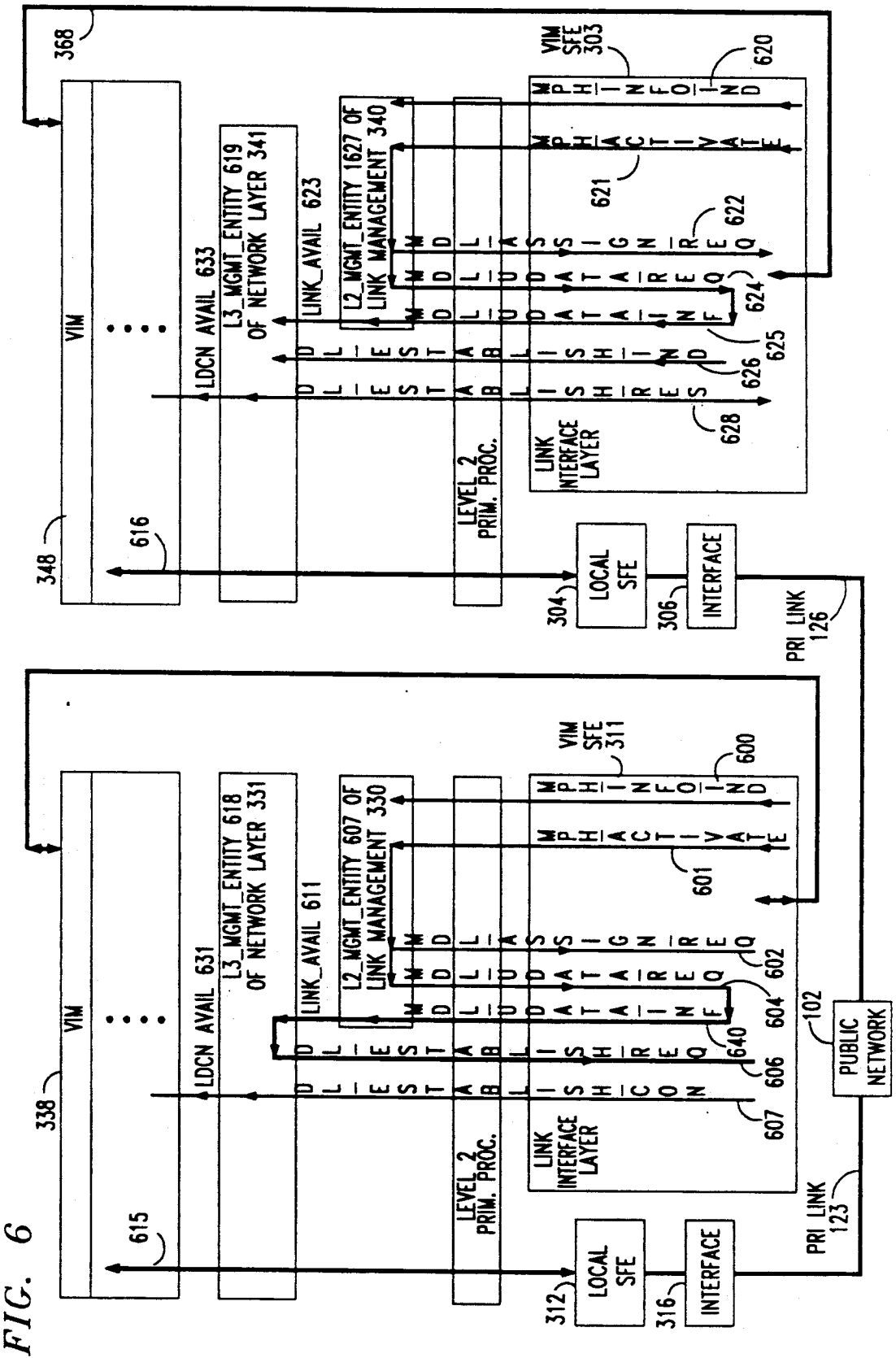
FIG. 6 logically illustrates a process for establishing a FRI link.

VIM application 338 now makes a correlation between a unique number which it assigns to the virtual interface and physical interface 316 that is used to communicate with switching node 104. VIM application 338 causes VIM angel 311 via path 351 to transmit the MPH_INFO_IND 600 primitive to entity 607 of FIG. 6. Primitive 600 designates the virtual interface number, interface type (FRI), and the number of channels in the FRI. The three channels in the FRI are designated 1, 2, and 24 by primitive 600. This primitive informs entity 607 that a FRI link has just come up which is using FRI channel 24 and FRI channels 1 and 2 of the FRI link. Entity 607 automatically assumes that FRI channel 24 is to be the D channel (actually it is a FRI D channel since it is handled by the VIM angel and the VIM application.) Next, VIM angel 311 transmits the MPH_ACTIVATE_IND 601 primitive indicating that it has framing. (Since the B channels have already been set up by VIM application 348, this can be done immediately.) VIM angel 303 performs similar functions by sending primitives 620 and 621.

Entity 607 now starts the standard procedure for establishing FRI LDC on FRI channel 24. Since the FRI interface is not a BRI interface, entities 607 and 627 do not have to establish a TEI number but assume a TEI equal to 0. Entities 607 and 627 do not have to exchange primitives similar to primitives 501 and 502 of FIG. 5.

In response to primitive 601, entity 607 transmits MDL_ASSIGN_REQ 602 primitive to VIM angel 311. VIM angel 311 is responsive to primitive 602 to transmit that primitive to VIM application 338. VIM application 338 transmits a message to local angel 312. In response to that message, local angel 312 assigns a TEI equal to 0 to a channel of B channel 139 of interface 316 and establishes a LAPD protocol on that channel. Entity 627 accomplishes the same task as performed by entity 607 by transmitting primitive 622.

Now, entity 607 initiates the exchange of node information by transmitting the MDL_UDATA_REQ 604 primitive. The latter is received by VIM angel 311 which responds with MDL_UDATA which contains information requesting the node number of switching node 104. Since switching node 104 has a node number, VIM angel 311 responds with that number in MDL_UDATA_IND 640 primitive. In response, entity 607 transmits LINK_AVAIL 611 primitive.

Entity 627 transmits MDL_UDATA_REQ 624. Since switching node 101 has a node number, VIM angel 303 responds with that node number in MDL_UDATA_IND 625 primitive. In response, entity 627 transmits LINK_AVAIL 623 primitive.

In response to LINK_AVAIL 611 primitive, entity 618 transmits a DL_ESTABLISH_REQUEST primitive 606 to VIM angel 311 which transfers the primitive 606 to VIM application 338. VIM application 338 transmits primitive 606 down to local angel 311. In response to primitive 606, local angel 312 responds to primitive 606 from VIM application 338 to establish a LCDN on the channel in a manner similar as that described for primitive 506 of FIG. 5. A SABME primitive is transmitted on the packetized channel of channel 139 to local angel 304. The latter angel responds to the SABME by generating a DL_ESTABLISH_IND primitive and transmits that primitive to VIM angel 303 via VIM application 348 and path 368. VIM angel 303 is responsive to that primitive to transmit DL_ESTABLISH_IND 626 primitive to entity 619. In response to primitive 626, entity 619 transmits LDCN_AVAIL 623 primitive and a DL_ESTABLISH_RES 628 primitive. VIM angel 303 responds to primitive 628 by communicating that primitive to VIM application 348 which transmits that primitive to local angel 304. In response, local angel 304 establishes its end of the LDC and transmits a UA primitive to local angel 312.

In response to the UA primitive, local angel 312 establishes its end of the LDC and transmits a DL_ESTABLISH_CON 607 primitive to entity 618 via path 615, VIM application 338, path 351, and VIM angel 311. Entity 618 responds to primitive 607 by transmitting the LDCN_AVAIL 611. At this point the FRI link is fully established with its own FRI LDC for signaling.

The LDCN_AVAIL message indicates the availability of another LDC and causes a higher level of initialization to take place. If the entity that has just become known to a node is a telephone, ISDN messages are exchanged in codeset 0 to obtain the service profile id (SPID) from the telephone or any other intelligent terminal. This information is transferred up to the applications layer where the terminal manager application uses this information to interpret button pushes. In addition, the SPID often contains the telephone number of the telephone. The terminal manager application negotiates with the telephone to assure that the telephone does not have a duplicate SPID and that the SPID is in a numbering plan of session layer 333.

Figure 7:
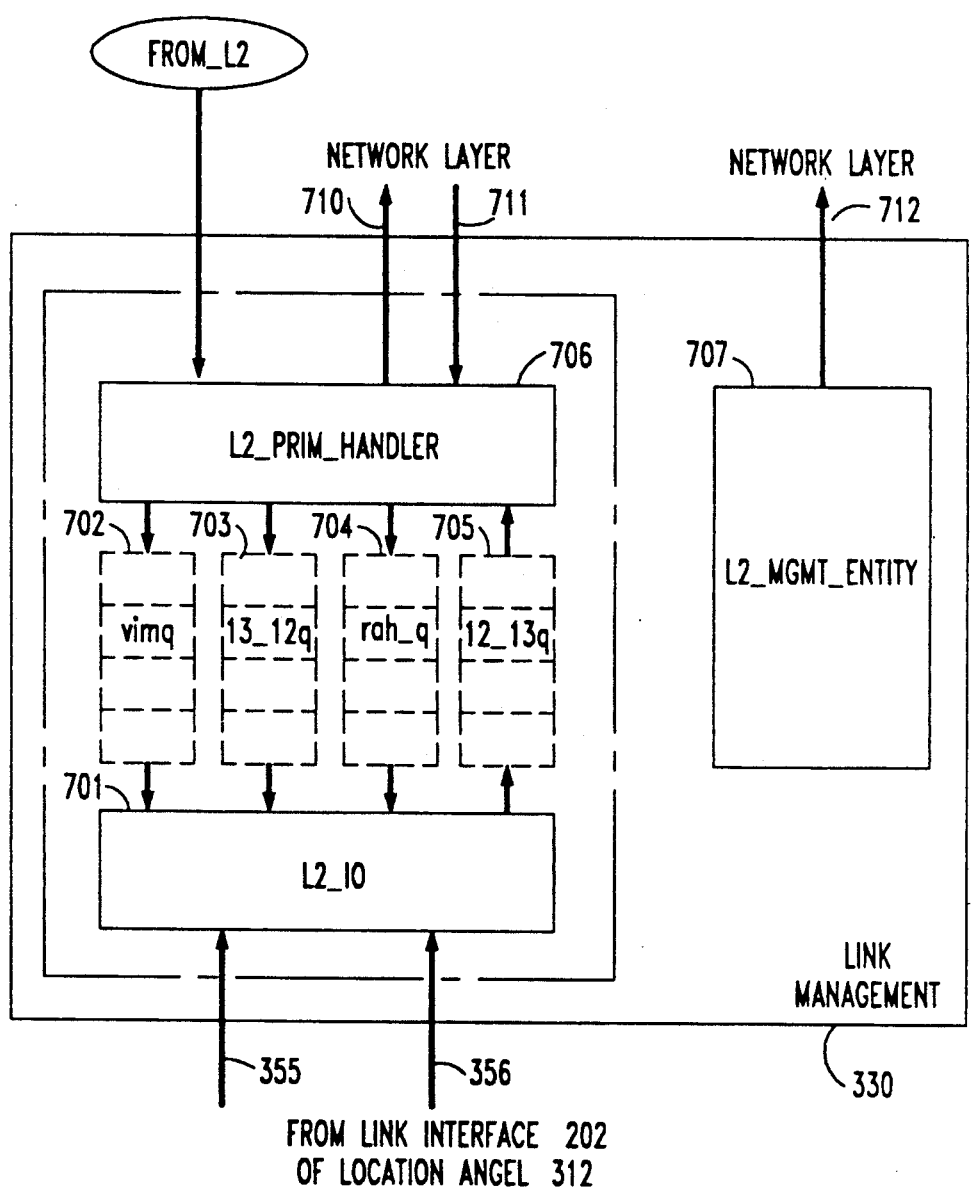
FIG. 7 illustrates a software architecture for a link interface.

Link management 330 is shown in greater detail in FIG. 7. Link management 330 consists of blocks 701, 706, and 707 and queues 702 through 705. Using queues 702 through 705, L2_IO 701 communicates data with link interfaces such as link interface 202 in local angel 312. L2_PRIM_HANDLER 706 is concerned with receiving and placing information into queues 702 through 704 from network layer 331. Block 706 also makes the determination of whether information should be transferred to network layer 331 or to L2_MGMT_ENTITY 707. In addition, block 706 performs the mapping between the sintf number and the switch and aintf number. L2_MGMT_ENTITY 707 is concerned with performing the functions of layer management 210 at the link management level.

Figure 8:
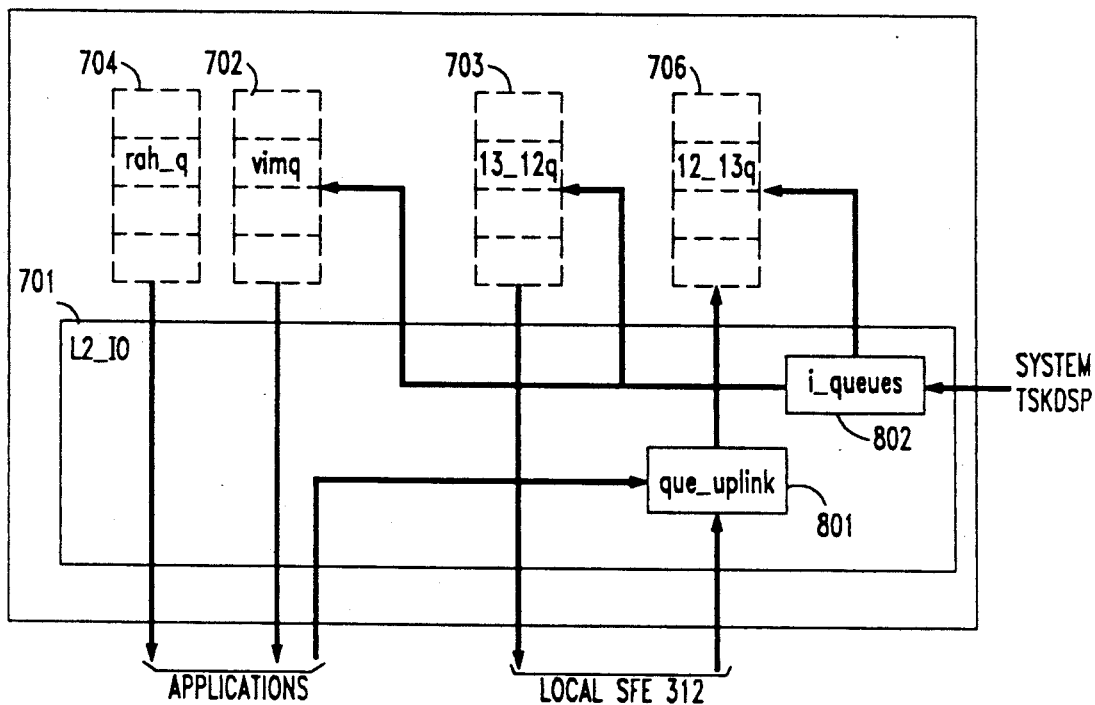
FIGS. 8 through 10 illustrate, in greater detail, the software architecture for a link interface.

L2_IO 701 is illustrated in greater detail in FIG. 8. Que_uplink 801 transfers information received either from the VIM application or remote angel handler application or local angel 312 into 12_13q 705.

The remote angel handles the L2-L3 function, the communication handler function, and the layer management which are running in the remote angel. Greater detail on the operation of the remote angel is given in the previously referenced copending application. Information flows directly from queues 702 through 704 to either the applications or the local angel. The queues are initialized by i_queues 802 under control of the system task dispenser. Blocks 801 and 802 are subroutines which are called by the appropriate entities.

Figure 9:
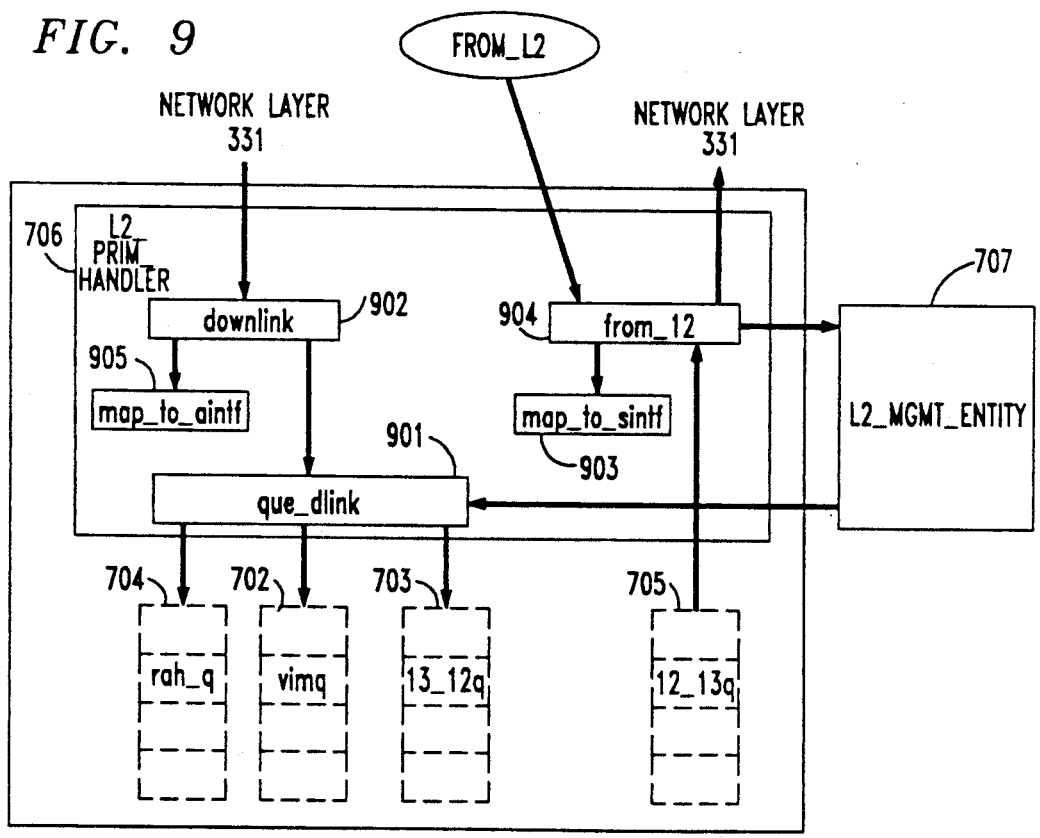

L2_prim_handler 706 is illustrated in greater detail in FIG. 9. With respect to data received from the different angels, block 706 determines whether this information should be transferred to network layer 331 or L2_MGMT_ENTITY 707. This function is performed by from_12 904 which reads the primitives contained in queue 705. Note that block 904 is periodically invoked by the system task dispenser to remove primitives from queue 705 (this is indicated by oval 906). Block 904 makes the decision of where to transfer the primitives stored in queue 705 by examining these primitives. If the primitive starts with a DL mnemonic, the primitive is to be transferred to network layer 331; if the primitive starts with a mnemonic of MDL or MPH, the primitive is to be transferred to L2_MGMT_ENTITY 707. The primitives transferred to or from L2_MGMT_ENTITY 707 are in three general classes. The first of these classes is information concerning the physical status of links in switching node 101. The second class is signaling being received from another link management layer in another node. An example of the second class is the signaling that occurs between switching node 104 and switching node 101 as described with respect to FIG. 5. With respect to second class, the overall function provided by 12_MGMT_ENTITY 707 is to negotiate with its corresponding peer to establish node numbers and to bring up an interface. The third class is the control of the interfaces within switching node 101.

Returning to FIG. 9, if from_12 904 determines that the primitive is not to be transferred to block 707 of FIG. 9, block 904 maps the switch and aintf numbers to the sintf number by invoking map_to_sintf 903. After obtaining the sintf, from_12 904 transfers the primitive to the network layer 331. Messages coming from network layer 331 are first processed by downlink 902 which invokes map_to_aintf 905. The latter subroutine converts the sintf number to the switch and the aintf numbers. Once the switch and aintf numbers have been obtained, downlink 902 invokes que_dlink 901. Also, downlink 902 converts the message protocol received from network layer 331 into an intra-link level protocol resulting in primitive. Subroutine 901 then places the primitive in queues 702, 703, or 702 based on the switch number.

Figure 10:
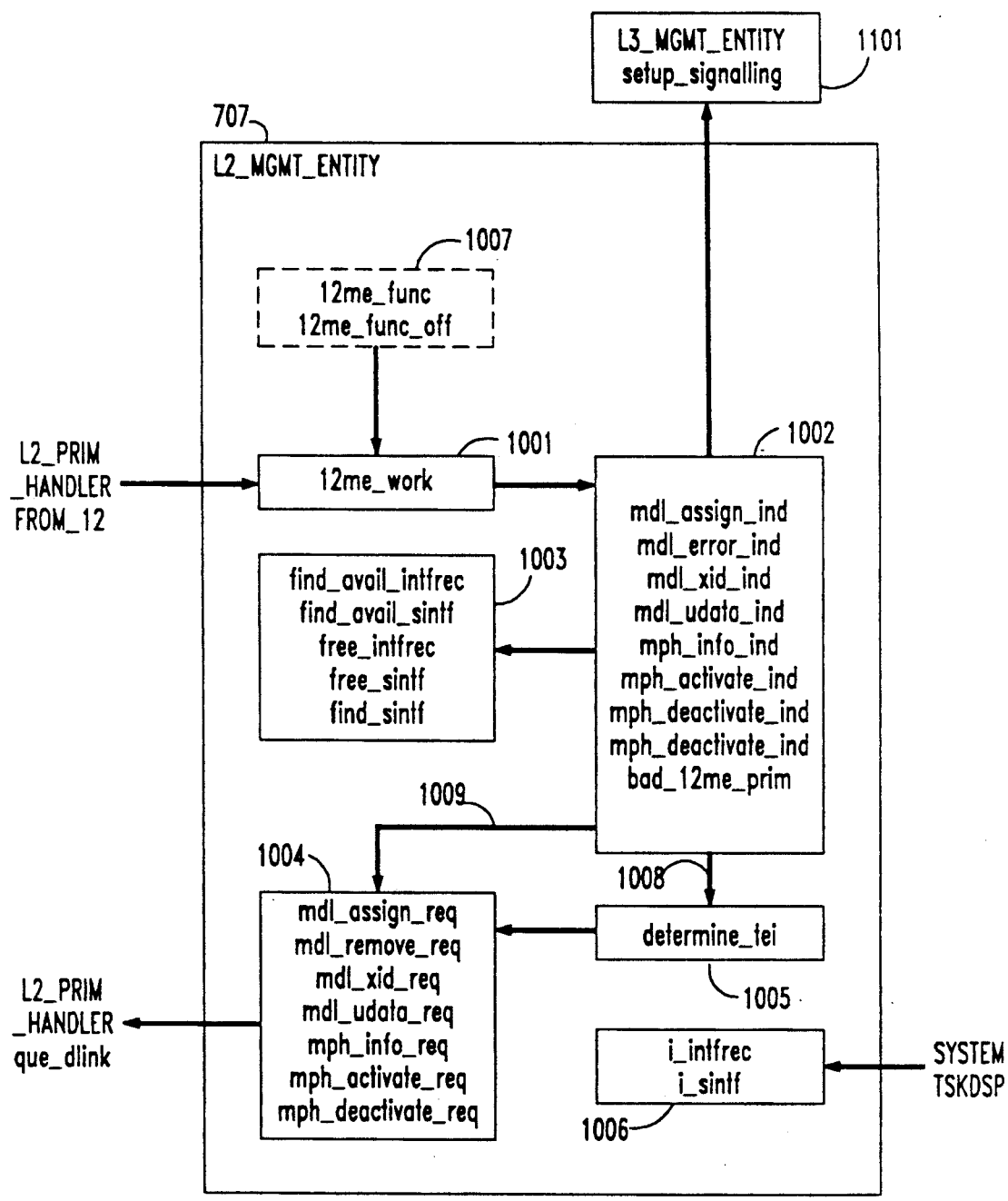

Now consider information which is being received by que_dlink 901 from L2_MGMT_ENTITY 707 as illustrated in FIG. 9. In explanation of the type of information that is being transferred from block 707 to subroutine 901, reference is now made to FIG. 10. During initialization of an interface, block 1001 activates certain subroutines in block 1002. Once activated, these subroutines activate other subroutines in block 1004. The subroutines in block 1004 transmit messages to the physical or virtual interface being initialized. Examples of subroutines in block 1002 activated by messages from an interface to transmit messages back to the link interface via block 1004 is given with respect to FIG. 5. For example, when node numbers are to be exchanged, subroutine MDL_UDATA_IND of block 1002 is activated which in turn activates subroutine MDL_UDATA_REQUEST of block 1004. In addition, the subroutines of block 1002 utilize the subroutines of block 1003 to find sintf and intfrec numbers. L2_MGMT_ENTITY 707 assigns the sintf numbers when a new interface is established and allocates memory for the interface within management information base 211. In addition, entity 707 frees sintf numbers when an interface is discontinued. The functions of entity 707 are performed in conjunction by subroutines in blocks 1002 and 1003 of FIG. 10. Block 1006 is utilized by the system task dispenser to initialize the intfrec and sintf numbers. In addition, some of the subroutines in block 1002 can transmit information up to the 13 management entity (L3_MGMT_ENTITY 1101 shown in FIG. 11)

Figure 11:
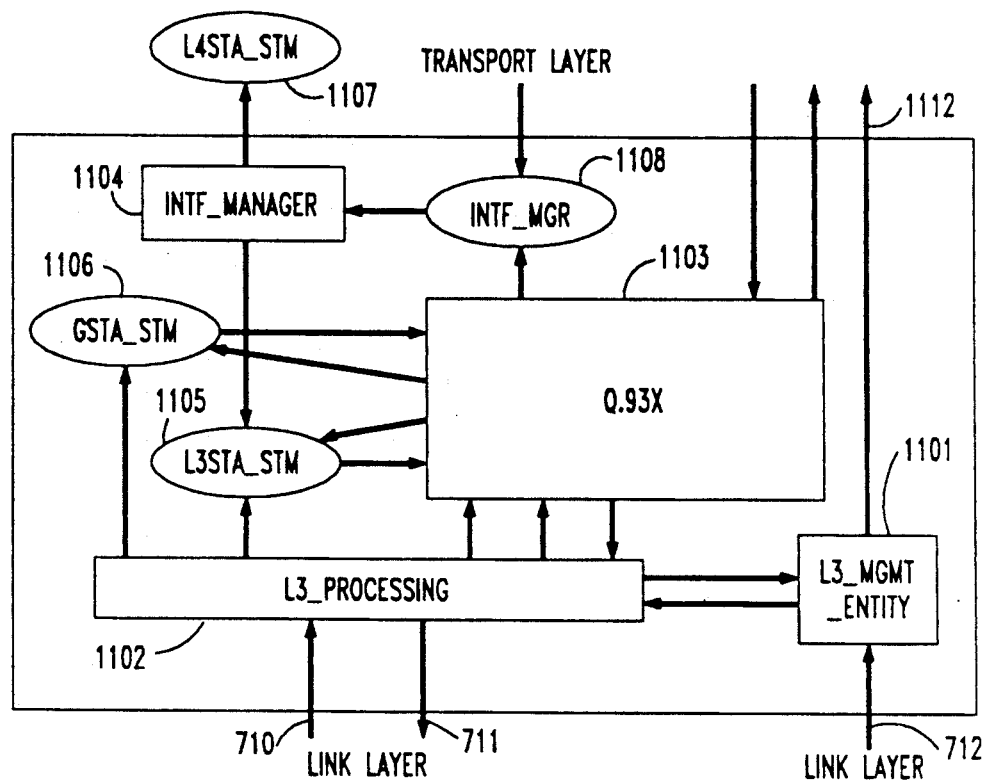
FIGS. 11 and 12 illustrate, in greater detail, a software architecture for a network layer.

FIG. 11 illustrates a detailed block diagram of network layer 204. There are two paths flowing between layers. One is a signaling path which is designated as paths 710 and 711, and the other one is a management information path which allows management entities to communicate and is designated as paths 712 and 1112. An example of management information stored in the management information base 211 is the sintf number which is inserted by entity 707, but the sintf is also used by different management entities in higher layers. Another example is the framing indication for an interface which is placed in the management information base 211 by entity 707. The management entity of the transport layer utilizes this framing indication to determine whether or not it has a transport connection to a particular node.

In FIG. 11, L3_PROCESSING 1102 is responsible for communicating signaling information to and from link management 330. L3_MGMT_ENTITY 1101 is responsible for establishing and removing signaling paths which are used for connections. For example, block 1101 initially transmits the setup message to initiate the setting up of a call. This message is transferred down to link management 330 for transmission. Q.93X block 1103 is responsible for all protocol handling. INTF_MANAGER 1104 is responsible for interfacing with transport layer 332.

Figure 12:
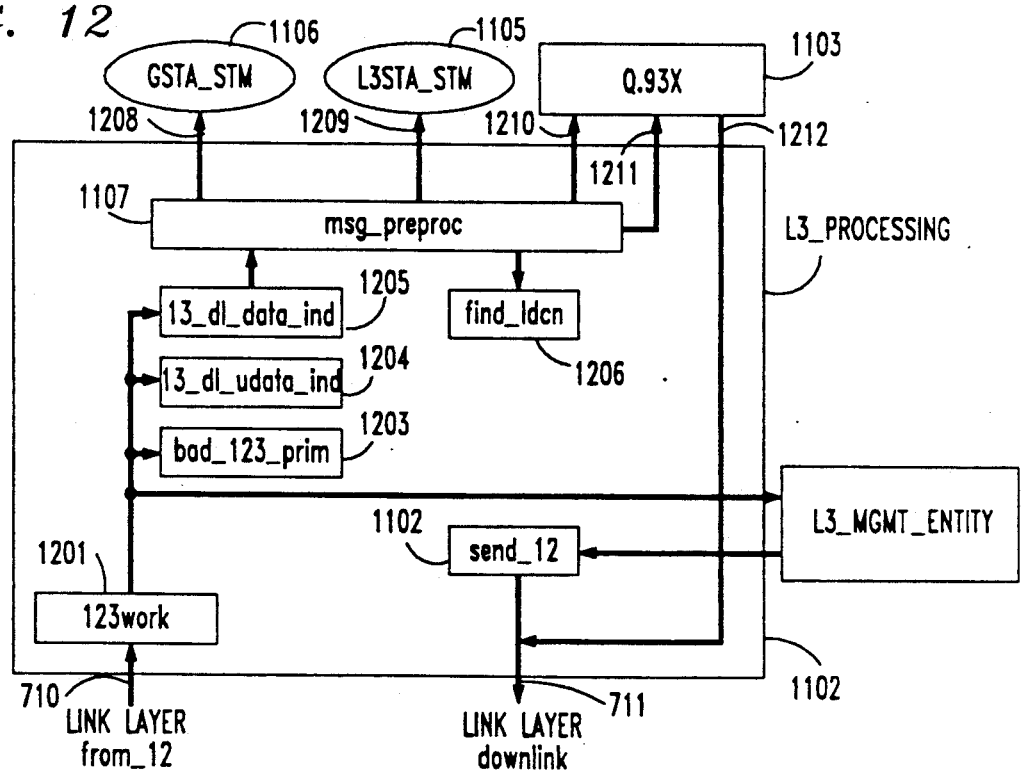

L3_PROCESSING 1102 is illustrated in greater detail in FIG. 12. Note that with respect to bringing up a VIM interface, L3_MGMT_ENTITY 1101 considers a VIM interface as a physical entity when it is setting up a FRI LDC, since the VIM application and VIM angel are capturing set up information from block 1101 and then retransmitting this information down the software layers. This information is actual transmitted on the packet channel of the physical B channel used for the FRI LDC. As information is received from link management 330, 123work 1201 decides whether the messages should be transferred to L3_MGMT_ENTITY 1101 or to subroutines 1203 through 1205. Subroutine 1203 processes primitives from the link layer which are not recognizable and simply records the fact that such a message has been received. Block 1204 can be used to receive the DL_UDATA_IND primitive. L3_dl_ind 1205 handles actual signaling messages when called from 123work 1201. Subroutine 1205 handles the Q.931 messages and transfers these to msg_preproc 1207. Subroutine 1207 does some of the initial Q.93X verification of the message. These functions include assuring that the protocol discriminator specifies one of the Q.931 protocols, checking the call reference value, and checking the message type to assure that it is a valid message type. The call reference value is checked for being a valid value and whether it refers to currently active call or a new call for which resources are available within switching node 101 to handle.

Msg_preproc 1207 either transfers the message to Q.93X block 1103 or to one of the state machines, GSTA_STM 1106 or 13STA_STM 1105 of FIG. 11. If the message is a global message, it is passed to state machine GSTA_STM 1106. (A global message is one that effects every call on an entire interface, such as a reset on a PRI link.) State machines 1105 and 1106 take care of particular types of messages and utilize block 1103 to process these messages. If the call reference value indicates a regular message, state machine 1105 is called. If the call reference value is null, then block 1102 passes this message directly to block 1103, since no state processing is required. In addition, if block 1207 of FIG. 12 determines that it has received an incorrect message, it transfers a message up to block 1103 of FIG. 11 requesting the transmission of a Q.93X message back to the other side informing the other side that an invalid message was received. (An example of an invalid message is an invalid protocol discriminator.) When msg_preproc 1207 is processing the message from link management, it utilizes find_ldcn 1206 to determine the translation between the sintf number and the LDCN. The LDCN is used to identify messages to the entities above L3_PROCESSING 1102. During the establishment of signaling by L3_MGMT_ENTITY 1101, block 1101 defines the correspondence between the LDCN and sintf number. The output of Q.93X 1103 flows directly through block 1102 since block 1103 has formatted the message for link management 203. However, messages from L3_MGMT_ENTITY 1101 must first be formatted by subroutine send_l2 1202 before being transferred to link management 203. Note, when L3_MGMT_ENTITY 1101 selects the LDC, block 1101 reports this number up to the management entity at the transport level via path 1112.

Consider elements 1103 through 1108 of FIG. 11. GSTA_STM 1106, 13STA_STM 1105, and 14STA_STM 1107 represent information being placed into state queues for execution by the system task dispenser. For example, when L3_PROCESSING 1102 receives a global call reference value, it places information into the queue for GSTA_STM 1106 which results in the system task dispenser initializing the global state machine resulting in a call to block 1103. Task 1105 handles messages which have a specific call reference value and initiates, under control of the system task dispenser, the appropriate routines within block 1103.

Block 1103 is responsible for performing all of the Q.93X protocol handling. The functions performed by block 1103 in processing the Q.931 protocol are clearly defined in the CCITT Blue Book specifications. Ovals 1105 and 1106 represent the execution of a task by the system task dispenser. These tasks handle particular types of call reference values and perform their work by calling specific parts of block 1103; whereas the tasks represented by ovals 1105 and 1106 are not directly specified by the ISDN specifications their functions are. The purpose of showing a task being initiated out of the ovals is to indicate that the system task dispenser controls the initialization of these tasks. For example, oval 1108 represents the request that block 1104 be executed when information is put into a queue of the system task dispenser indicating that block 1104 should be executed.

Block 1104 serves as an interface to transport layer 205 and processes messages coming down from the transport layer 205 either to convert these messages into signaling messages to be processed by block 1103 via oval 1105 or to handle request for facilities or transport capabilities from the higher levels. The primary job of INTF_MANAGER 1104 is the management of facility and transport for a particular interface. In order to do this, block 1104 is responsible for handling the initial set up of calls, e.g., the call request and negotiating the number of channels necessary for each call. In order to perform this function, block 1104 is aware of the number of B channels associated with each LDC and chooses a particular B channel or channels to be used for a call. It is not the responsibility of block 1104 to determine a path through a switching node such as switching node 101 or a path through multiple switching nodes. Transport layer 205 has the responsibility for finding that type of a path as is described in a later section. Block 1104 determines by negotiation which B channels are used for a particular call. This negotiation is carried out with another corresponding entity in the other system element also attempting to set up that call, e.g., switching node 104 of FIG. 3.

During the set up of a call originated by an individual telephone, block 1104 initially negotiates with the telephone concerning which B channel is utilized to transport the voice information and handles the signaling involved in the Q.93X protocol. In addition, interface manager 1104 sends the appropriate commands down to the link and physical layers to cause the interface itself to be appropriately set up.

As the call progresses, transport layer 205 determines where the call is going to and sets up the internal switching within the node 101. Transport layer 205 uses the intra-nodal routing routine to accomplish this function. After the transport has been arranged through node 101, transport layer 332 invokes block 1104 via oval 1108 to negotiate the setup of the call on the outgoing interface of node 101. Block 1104 performs this in a similar manner to the negotiation of the original setup request from the originating telephone. In summary, block 1104 is responsible for the selection by negotiation which B channels are used from a particular system interface for a call.

To better understand the functions of the blocks illustrated in FIG. 11, consider the following detailed example concerning the setting up of a call to switching node 101. Initially, there would be a request (DL_DATA_IND) primitive coming up from link management 330. L3_PROCESSING 1102 is responsive to this primitive to check the existence of a specific call reference value and to check the protocol. Block 1102 then places into the queue for 13STA_STM 1105 the fact that a message has been received. Under control of the system task dispenser, oval 1105 initiates the execution of block 1103 to do the protocol processing on the received message to assure, for example, that the message is of the correct state. Block 1103 then indicates to the system task dispenser via oval 1108 that there is a call request and that block 1104 should be executed. Block 1104 then verifies that there is a B channel available on the requested interface to handle this call and sends back a call proceeding request via oval 1105. Under control of the system task dispenser, oval 1105 initiates block 1103 to generate the call proceeding message back to network layer 204 in the originating telephone. In addition, block 1104 initiates transport layer 332 via oval 1107 to determine that the required resources exist within node 101 to complete the call. The required resources may be limited to those of switching node 101 or may require resources in other nodes in order to reach the destination node. It is the responsibility of transport layer 332 to determine whether the destination node can be reached. Note, when block 1103 is invoked to transmit the call proceeding message, block 1103 first checks to make sure that the transmission of the call proceeding message was correct for this stage of the call and forms and sends the call proceeding message to L3_PROCESSING 1102. Block 1102 forms this message into a dl_data_req primitive which is transmitted to link management 330.

During the processing of the information by transport layer 332, if layer 332 has no information for routing to the destination node, layer 332 with session layer 333 determines the path to the destination node. Session layer 333 determines which node the call is destined for by evaluating the dial digits. Once session layer 333 has picked the node, transport layer 332 is responsible for determining how to get to that node. After determining how to route the call, transport layer 332 sets up a call to the destination node. In order to set up the call to the other node, transport layer 332 invokes INTF_MANAGER 1104 via oval 1108. Block 1104 selects an interface that is controlled by the LDC and connected to the destination node, and block 1104 then selects a B channel on that interface. After accomplishing this selection, block 1104 negotiates the set up of the call with the other node. In order to negotiate the set up of the call, block 1104 invokes the state machine associated with oval 1105 to have the proper message generated by block 1103 for transmission to the destination node. Block 1104 also selects the call reference value to be utilized on the LDC. Block 1103 verifies that the message can be transmitted (a setup message) and formulates this message and transfers it to L3_PROCESSING block 1102.

The information on paths 1113 and 1114 comprises messages that were received that had a null call reference value. These messages fall into two general categories. The first category is messages which are being transported back and forth between layers 333 through 336 with their equivalent peers in another node. The second category of messages is those messages that are not call related. For example, the button pushes on a station set are not call related and are transmitted from the station set to the node with a null call reference value.

Figure 13:
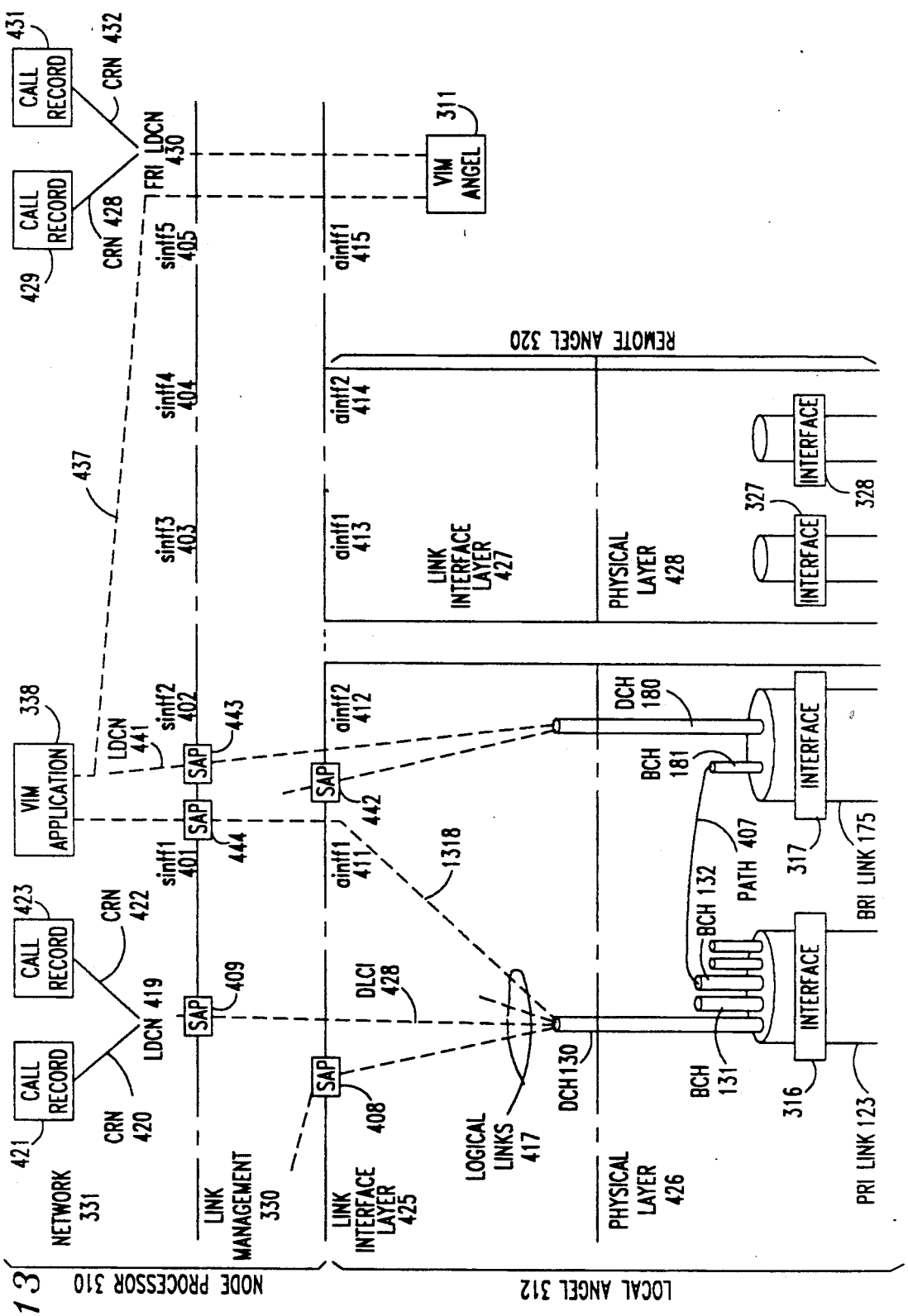
FIGS. 13 and 14 illustrate other embodiments of the invention.
Figure 14:
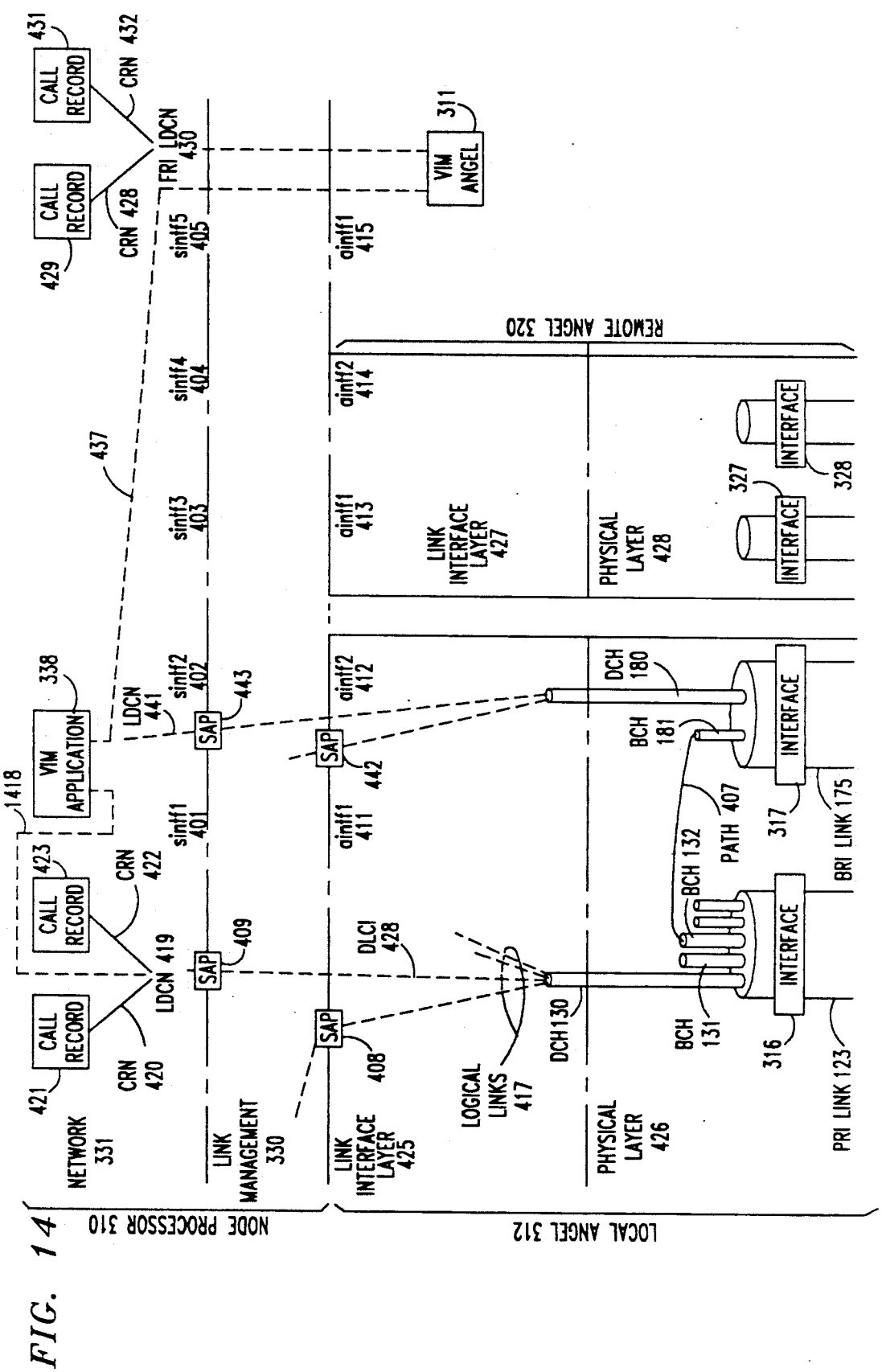

The following describes three more embodiments for communicating the FRI LDC of FRI link 350 between VIM applications 338 and 348 of FIG. 3. In the first embodiment as described in the previous paragraphs, the FRI LDC is communicated in the packetized channel of B channel 131 of PRI link 123 and B channel 139 of PRI link 126. The second embodiment communicates the FRI LDC of FRI link 350 by establishing a logical link in D channels 130 and 138 and is illustrated in FIG. 13. Such logical links are illustrated in FIG. 13. The third embodiment communicates the FRI LDC by establishing a communication path (e.g., path 1418) utilizing user-user temporary signaling information (call or non-call related) messages on LDCN 1419 and is illustrated in FIG. 14. The fourth embodiment is very similar to the first embodiment except that the B channel communicating the FRI LDC is divided into subchannels. One subchannel is packetized and used to communicate the FRI LDC. The division of the B channel is performed in the manner described with respect to FIG. 2. The remaining subchannels can be used to communicate voice or data information. Using the second, third, or fourth embodiments, VIM application 338 and VIM angel 311 function together in the same manner as in the first embodiment to use the FRI link which conceptually terminates on a virtual interface. VIM application 348 and VIM angel 303 also perform similar functions as in the first embodiment.

Consider how the second embodiment establishes a logical link on D channels 130 and 138. As in the first embodiment, VIM application 338 uses the administered telephone number of terminal processor 301 to initially request that software layers 331 through 333 transmit a setup message with the telephone number in the called party number field. Also within an IE of codeset 6 of the setup message is the node number of node processor 310. In addition, the setup message requests that a packetized logical link be established on D channel 130. By transmitting the setup message, VIM application 338 is placing a call to VIM application 348.

The setup message is transmitted in the LDC of the D channel of PRI link 123, which had previously been established when PRI link 123 was set up, to switching node 102. Switching node 102 processes this request in a normal manner with respect to both switching node 101 and switching node 104. The setup message requests a logical link in D channel 130, e.g. SAP 444 (path 1318) of FIG. 13. of the present example. After establishment of the FRI LDC on SAP 444, requests are made for two B channels. Switching node 102 communicates with switching node 104 via the LDC of D channel of BRI link 126. VIM application 348 answers this call, and messages are transmitted back and forth as if a human being had answered the call on a conventional telephone set. Initially, the setup message is transferred to network layer 341. Network layer 431 transfers the setup message to session layer 343 via transport layer 342. When the setup message is received, session layer 343 handles this call in the same manner as it would any other call. Session layer 343 is responsive to the telephone number to determine that it is directed to VIM application 348 as an end point and transfers the setup message to the application layer 345. Application layer 345 examines the dialed number in the called party number field and, based on that, transfers the call setup request to VIM application 348.

If VIM application 348 chooses to accept the call upon receipt of the call setup message, VIM application 348 transmits down to the lower software layers a request that the logical link be established on D channel 138 and that an acknowledgment message be sent. In response, network layer 341 formulates a connection message that is then transferred back to node 101 via switching node 102. Network 341 also negotiates with switching node 102 for the establishment of the logical link. Switching node 102 is responsive to the connection message to establish a packet connection between a logical link (SAP 444) in D channel 130 and corresponding logical link in D channel 138. If VIM application 348 decides not to answer the message, then network layer 341 tears the call down by sending the proper messages to node processor 310 and switching node 102.

After requesting the transmission of the connection message, VIM application 348 transmits a request via link management 340. In response, link management 340 requests that local angel 304 control interface 306 so that B channels 140 and 141 become FRI B channels and establish the new logical link on D channel 138. A software path from the logical link is then interconnected through local angel 304 to link management 340. As described in greater detail with respect to FIG. 5, VIM application 348 then utilizes VIM angel 303 to inform software layers 340 through 346 that virtual interface (implemented by VIM angel 303) is being set up. Link management 340 responds to the virtual interface being set up by establishing and identifying the LDC of FRI link 350 as being provided by the logical link of D channel 138.

After setting up the logical link, VIM application 338 application requests that a second set up message be transmitted to interconnect B channel 132 to B channel 140 and B channel 133 to B channel 141 via switching node 102. The resulting two communication paths become FRI B channels.

In setting up virtual interface as implemented by VIM angel 303, VIM application 348 maps the physical channel number (aintf) of interface 306 into the virtual channels numbers (sintf). In the present example, the logical link of D channel 138 becomes a FRI LDC which is illustratively assigned the number 24. B channel 140 is mapped into FRI channel 1, and B channel 141 is mapped into FRI channel 2. Furthermore, link management 340 identifies virtual interface with a sintf and correlates this sintf with the VIM angel number and the aintf for the virtual interface. After this mapping and initialization of physical interfaces is completed, the FRI link is established between switching node 101 and switching node 104.

After the connection message is received back from switching node 104, VIM application 338 and VIM angel 311 perform the same functions as local angel 312 performs in notifying software layers 330 through 335 that a new link has been set up. Greater detail on setting up the FRI link is given with respect to FIG. 5. After the VIM applications and VIM angels in both node processors 310 and 301 have completed the execution of the functions described with respect to FIG. 5, the FRI link is established both from a hardware and software perspective between switching node 101 and switching node 104.

Consider how the third embodiment establishes a communication path to support the FRI LDC of FRI link 350 using user-user temporary signaling. As in the first embodiment, VIM application 338 uses the administered telephone number of terminal processor 301 to initially request that software layers 331 through 333 transmit a setup message with the telephone number in the called party number field. Also within an IE of codeset 6 of the setup message is the node number of node processor 310. However, the setup message does not request a physical connection but rather a signaling connection. In addition, the setup message requests a user-user connection in the LDC of the D channel of PRI link 123. By transmitting the setup message, VIM application 338 is placing a call to VIM application 348.

The setup message is transmitted in the LDC of the D channel of PRI link 123, which had previously been established when PRI link 123 was set up, to switching node 102. Switching node 102 processes this request in a normal manner with respect to both switching node 101 and switching node 104. The setup message requests a user-user signaling connection. After establishment of the FRI LDC on the user-user signaling connection, requests are made for two B channels. Switching node 102 communicates with switching node 104 via the LDC of D channel of BRI link 126. VIM application 348 answers this call, and messages are transmitted back and forth as if a human being had answered the call on a conventional telephone set. Initially, the setup message is transferred to network layer 341. Network layer 431 transfers the setup message to session layer 343 via transport layer 342. When the setup message is received, session layer 343 handles this call in the same manner as it would any other call. Session layer 343 is responsive to the telephone number to determine that it is directed to VIM application 348 as an end point and transfers the setup message to the application layer 345. Application layer 345 examines the dialed number in the called party number field and, based on that, transfers the call setup request to VIM application 348.

If VIM application 348 chooses to accept the call upon receipt of the call setup message, VIM application 348 transmits down to network layer 341 a request that the user-user signaling connection be established on the LDC of D channel 138 and that an acknowledgment message be sent. In response, network layer 341 establishes the user-user signaling connection and formulates a connection message that is then transferred back to node 101 via switching node 102. Network 341 also negotiates with switching node 102 for the establishment of a user-user signaling connection. Switching node 102 is responsive to the connection message to establish a connection between the user-user signaling in the LDC of D channel 130 and the user-user signaling in the LDC of D channel 138. If VIM application 348 decides not to answer the message, then network layer 341 tears the call down by sending the proper messages to node processor 310 and switching node 102.

After requesting the transmission of the connection message, VIM application 348 transmits a request via link management 340. In response, link management 340 requests that local angle 304 control interface 306 so that B channels 140 and 141 become FRI B channels. VIM application 348 also transmits a request to network layer 341 to establish the user-user signaling connection and communicate information received on that connection with VIM application 348. As described in greater detail with respect to FIG. 5, VIM application 348 then utilizes VIM angel 303 to inform software layers 340 through 346 that virtual interface (implemented by VIM angel 303) is being set up. Link management 340 responds to the virtual interface being set up by establishing and identifying the FRI LDC of 350 as being provided by the user-user signaling connection.

After setting up the user-user signaling connection, VIM application 338 application requests that a second set up message be transmitted to interconnect B channel 132 to B channel 140 and B channel 133 to B channel 141 via switching node 102. The resulting two communication paths become FRI B channels.

In setting up virtual interface as implemented by VIM angle 303, VIM application 348 maps the physical channel number (aintf) of interface 306 into the virtual channels numbers (sintf). In the present example, the user-user signaling connection in the LDC of D channel 138 becomes a FRI D channel which is illustratively assigned the number 24. B channel 140 is mapped into FRI channel 1, and B channel 141 is mapped into FRI channel 2. Furthermore, link management 340 indentifies virtual interface with a sintf and correlates this sintf with the VIM angel number and the aintf for the virtual interface. After this mapping and initialization of physical interfaces is completed, the FRI link is established between switching node 101 and switching node 104.

After the connection message is received back from switching node 104, VIM application 338 and VIM angle 311 perform the same functions as local angel 312 performs in notifying software layers 330 through 335 that a new interface has been set up. In manner similar to VIM application 338 and VIM angle 311, VIM application 348 and VIM angel 304 map and identify the FRI Link. Greater detail on setting up the FRI link is given with respect to FIG. 6. After the VIM applications and VIM angels in both node processors 310 and 301 have completed the execution of the functions described with respect to FIG. 6, the FRI link is established both from a hardware and software perspective between switching node 101 and switching node 104.

It is to be understood that the above-described embodiments are merely illustrative of the principles of the invention and that other arrangements may be devised by those skilled in the art without departing from the spirit and scope of the invention. In particular, other software and structures may be used to implement the invention. Further, it would be clear to one skilled in the art that a FRI link could be established on an existing FRI link.

We claim:

1. An apparatus in a first and second switching nodes for initiating an virtual link between said switching nodes through a switching system, comprising:

means for establishing a plurality of physical transport channels between said switching nodes through said switching system utilizing a standard protocol on a physical signaling channel;

means for establishing a virtual signaling channel and a plurality of virtual transport channels via said physical transport channels; and means for identifying said virtual signaling channel and said plurality of virtual transport channels to said switching nodes allowing calls to be set up on said virtual transport channels using said standard protocol on said virtual signaling channel without said physical signaling channel and said switching system being involved with the call setup of said calls.

2. The apparatus of claim 1 wherein each of said switching nodes has a plurality of software layers and said virtual signaling channel establishing means comprises an application software module at the highest software layer for receiving virtual signaling information communicated via one of said physical transport channels and for transferring said virtual signaling information to said identifying means; and said identifying means comprises an virtual interface software module at the lowest software layer and said virtual interface software module responsive to said transferred virtual signaling information for transferring said virtual signaling information to higher software layers by simulating another physical signaling channel.

3. The apparatus of claim 2 wherein said higher software layers transmit information on said virtual signaling channel by transferring the transmit information to said virtual interface software module and said virtual interface software module responsive to said transmit information for accepting said transmit information by simulating said other physical signaling channel and transferring said transmit information to said application software module; and said application software module responsive to said transmit information for communicating said transmit information out on said one of said transport channels as said virtual signaling channel.

4. The apparatus of claim 3 wherein said standard protocol is the ISDN protocol.

5. An apparatus in a first and second switching nodes for initiating an virtual link between said switching nodes through a switching system, comprising:

means for establishing a plurality of physical transport channels between said switching nodes through said switching system utilizing a standard protocol on a physical signaling channel;

means for establishing a plurality of virtual transport channels via said physical transport channels;

means for establishing a virtual signaling channel using user communication facilities of said standard protocol on said physical signaling channel; and means for identifying said virtual signaling channel and said plurality of virtual transport channels allowing calls to be set up on said virtual transport channels by reusing said standard protocol on said virtual signaling channel without said switching system being involved with the call setup of said calls.

6. The apparatus of claim 5 wherein each of said switching nodes has a plurality of software layers and said virtual signaling establishing means comprises an application software module at the highest software layer for receiving virtual signaling information communicated via said user information and for transferring said virtual signaling information to said identifying means; and said identifying means comprises an virtual interface software module at the lowest software layer and said virtual interface software module responsive to said transferred virtual signaling information for transferring said virtual signaling information to higher software layers by simulating another physical signaling channel.

7. The apparatus of claim 6 wherein said higher software layers transmit information on said virtual signaling channel by transferring the transmit information to said virtual interface software module and said virtual interface software module responsive to said transmit information for accepting said transmit information by simulating said other physical signaling channel and transferring said transmit information to said application software module; and said application software module responsive to said transmit information for communicating said transmit information out as user information on said physical signaling channel to communicate said virtual signaling channel.

8. The apparatus of claim 7 wherein said standard protocol is the ISDN protocol.

9. An apparatus in a first and second switching nodes for initiating an virtual link between said switching nodes through a switching system, comprising:

means for establishing a plurality of physical transport channels between said switching nodes through said switching system utilizing a standard protocol on a logical link of physical signaling channels;

means for establishing a plurality of virtual transport channels via said physical transport channels;

means for establishing a virtual signaling channel on another logical link of said physical signaling channels; and means for identifying said virtual signaling channel and said plurality of virtual transport channels allowing calls to be set up on said virtual transport channels using said standard protocol on said virtual signaling channel without said logical link of said physical signaling channels and said switching system being involved with the call setup of said calls.

10. The apparatus of claim 9 wherein each of said switching nodes has a plurality of software layers and said virtual signaling channel establishing means comprises an application software module at the highest software layer for receiving virtual signaling information communicated via said other logical link of said physical signaling channels and for the transferring said virtual signaling information to said identifying means; and said identifying means comprises an virtual interface software module at the lowest software layer and said virtual interface software module responsive to said transferred virtual signaling information for transferring said virtual signaling information to higher software layers by simulating another physical signaling channel.

11. The apparatus of claim 10 wherein said higher software layers transmit information on said virtual signaling channel by transferring the transmit information to said virtual interface software module and said virtual interface software module responsive to said transmit information for accepting said transmit information by simulating said other physical signaling channel and transferring said transmit information to said application software module; and said application software module responsive to said transmit information for communicating said transmit information out on said other logical link of said physical signaling channel as said virtual signaling channel.

12. The apparatus of claim 11 wherein said standard protocol is the ISDN protocol.

13. A switching system comprising:

a first switching node interconnecting a second switching node and a third switching node;

means within said first switching node responsive to call setup requests from said second switching node to route calls to said third switching node for processing each of said call setup requests whereby said first switching node routes each of said calls through said first switching node and transmits another call setup request for each of said call setup requests from said second switching node to said third switching node so that said third switching node can respond to each of said calls;

means within said second switching node and said third switching node for establishing a communication path through said first switching node from said second switching node to said third switching node for the communication of other calls without said first switching node processing call setup requests for said other calls.

14. The switching system of claim 13 wherein said first switching node is interconnected to said second switching node and said third switching node by physical links with each physical link being terminated at each end by physical interfaces that are individually interconnected to one of said switching nodes and each of said physical interfaces having at least one signaling channel and a plurality of transport channels for the communication of call information on the terminated physical link and each of said physical interfaces communicates signaling information on said signaling channel using a standard protocol to control calls on said transport channels including said call setup requests, said establishing means comprises;

means for assigning transport channels from said physical links interconnecting said second switching node and said third switching node through said first switching node to establish a virtual link to provide said communication path through said first switching node from said second switching node to said third switching node;

means for setting up a virtual signaling channel on said virtual link in accordance with said standard protocol;

means for identifying said assigned transport channels with said virtual signaling channel; and means for using said virtual signaling channel to communicate signaling information distinct from said signaling information of said signaling channel of physical link using said standard protocol to directly control calls on said assigned transport channels.

15. The switching system of claim 14 wherein said setting up means comprises means for establishing said virtual signaling channel using one of said assigned transport channels.

16. the switching system of claim 15 wherein said standard protocol is the ISDN protocol.

17. The switching system of claim 15 wherein said second switching node having a processor to control the operation of said second switching node and said processor having a plurality of software layers arranged in a hierarchical structure and said physical interface interconnecting said first switching node and said second switching node directly controlled by a lowest one of said plurality of software layers and said lowest one of said plurality of software layers responsive to signaling information received from said signaling channel of said physical interface to communicate said signaling information to another one of said plurality of software layers and said using means comprises an application means in a highest one of said plurality of software layers and an virtual interface means in said lowest one of said plurality of software layers;

said lowest one of said plurality of software layers further responsive to information received in the one of said assigned transport channels of said physical interface interconnecting said first switching node and said second switching node to communicate said information to said application means;

said application means responsive to said received information from said one of said assigned transport channels of said physical interface interconnecting said first switching node and said second switching node for converting that information into said signaling information of said virtual signaling channel;

said application means further responsive to said signaling information of said virtual signaling channel for transferring said signaling information of said virtual signaling channel to said virtual interface means;

said virtual interface means responsive to said signaling information of said virtual signaling channel for transferring said signaling information of said virtual signaling channel to said lowest one of said plurality of software layers in the same manner as said physical interface whereby said lowest one of said plurality of software layers reponds as if said signaling information of said virtual signaling channel was signaling information from a signaling channel of another physical interface.

18. The switching system of claim 17 wherein said lowest one of said plurality of software layers further responsive to signaling information from said other one of said plurality of software layers designated for said signaling channel of said physical interface to communicate said signaling information on said signaling channel of said physical interface;

said virtual interface means responsive to other signaling information for said virtual signaling channel generated by said other one of said plurality of software layers and transferred via said lowest one of said plurality of software layers for receiving said other signaling information of said virtual signaling channel in the same manner as said physical interface whereby said lowest one of said plurality of software layers responds as if said other signaling information of said virtual signaling channel was signaling information for said signaling channel of said other physical interface;

said virtual interface means further responsive to said other signaling information for transferring said other signaling information to said application means;

said application means further responsive to said other signaling information from said virtual interface means for converting said other signaling information of said virtual signaling channel into information for transmission on said one of said assigned transport channels of said physical interface interconnecting said first switching node and said second switching node; .

said application means further responsive to the converted other signaling information of said virtual signaling channel for transferring said converted other signaling information to said lowest one of said plurality of software layers; and said lowest one of said plurality of software layers further responsive to said converted other information for communicating said converted other information to said physical interface for transmission on said one of said assigned transport channels of said physical interface interconnecting said first switching node and said second switching node.

19. The switching system of claim 14 wherein said setting up means comprises means for establishing said virtual signaling channel utilizing user communication facilities of said standard protocol on a first signaling channel of said physical signaling channels interconnecting said second switching node to said first switching node and on a second signaling channel of said physical signaling channels interconnecting said third switching node to said first switching node, said first switching node transfers information on said used communication facilities between first and second signaling channels 20. The switching system of claim 19 wherein said standard protocol is in the ISDN protocol.

21. The switching system of claim 19 wherein said second switching node having a processor to control the operation of said switching node and said processor having a plurality of software layers arranged in a hierarchical structure and said physical interface interconnecting said first switching node and said second switching node directly controlled by a lowest one of said plurality of software layers and said lowest one of said plurality of software layers responsive to signaling information received from said signaling channel of said physical interface to communicate said signaling information to another one of said plurality of software layers and said using means comprises an application means in a highest one of said plurality of software layers and an virtual interface means in said lowest one of said plurality of software layers;

said lowest one of said plurality of software layers further responsive to information received from said user communication facilities to communicate said information to said application means;

said application means responsive to said received information from said user communication facilities for converting that information into said signaling information of said virtual signaling channel;

said application means further responsive to said signaling information of said virtual signaling channel for transferring said signaling information of said virtual signaling channel to said virtual interface means;

said virtual interface means responsive to said signaling information of said virtual signaling channel for transferring said signaling information of said virtual signaling channel to said lowest one of said plurality of software layers in the same manner as said physical interface whereby said lowest one of said plurality of software layers responds as if said signaling information of said virtual signaling channel was signaling information from a signaling channel of another physical interface.

22. The switching system of claim 21 wherein said lowest one of said plurality of software layers further responsive to signaling information from said other one of said plurality of software layers designated for said signaling channel of said physical interface to communicate said signaling information on said signaling channel of said physical interface;

said virtual interface means responsive to other signaling information for said virtual signaling channel generated by said other one of said plurality of software layers and transferred via said lowest one of said plurality of software layers for receiving said other signaling information of said virtual signaling channel in the same manner as said physical interface whereby said lowest one of said plurality of software layers responds as if said other signaling information of said virtual signaling channel was signaling information for said signaling channel of said other physical interface;

said virtual interface means further responsive to said other signaling information for transferring said other signaling information to said application means;

said application means further responsive to said other signaling information from said virtual interface means for converting said other signaling information of said virtual signaling channel into information for transmission by said user communication facilities said application means further responsive to the converted other signaling information of said virtual signaling channel for transferring said converted other signaling information to said lowest one of said plurality of software layers; and said lowest one of said plurality of software layers further responsive to said converted other information for communicating said converted other information to said physical interface for transmission by said user communication facilities.

23. The switching system of claim 14 wherein said setting up means comprises means for establishing said virtual signaling channel utilizing a logical link of a first signaling channel of said physical signaling channels interconnecting said second switching node to said first switching node and a logical link of a second signaling channel of said physical signaling channels interconnecting said third switching node to said first switching node, said first switching node transfers information on said logical links between said first and second physical signaling channels.

24. The switching system of claim 23 wherein said standard protocol is the ISDN protocol.

25. The switching system of claim 23 wherein said second switching node having a processor to control the operation of said second switching node and said processor having a plurality of software layers arranged in a hierarchical structure and said physical interface interconnecting said first switching node and said second switching node directly controlled by a lowest one of said plurality of software layers and said lowest one of said plurality of software layers responsive to signaling information received from said signaling channel of said physical interface to communicate said signaling information to another one of said plurality of software layers and said using means comprises an application means in a highest one of said plurality of software layers and an virtual interface means in said lowest one of said plurality of software layers;

said lowest one of said plurality of software layers further responsive to information received from said user communication facilities to communicate said information to said application means;

said application means responsive to said received information from said user communication facilities for converting that information into said signaling information of said virtual signaling channel;

said application means further responsive to said signaling information of said virtual signaling channel for transferring said signaling information of said virtual signaling channel to said virtual interface means;

said virtual interface means responsive to said signaling information of said virtual signaling channel for transferring said signaling information of said virtual signaling channel to said lowest one of said plurality of software layers in the same manner as said physical interface whereby said lowest one of said plurality of software layers responds as if said signaling information of said virtual signaling channel was signaling information from a signaling channel of another physical interface.

26. The switching system of claim 25 wherein said lowest one of said plurality of software layers further responsive to signaling information from said other one of said plurality of software layers designated for said signaling channel of said physical interface to communicate said signaling information on said signaling channel of said physical interface;

said virtual interface means responsive to other signaling information for said virtual signaling channel generated by said other one of said plurality of software layers and transferred via said lowest one of said plurality of software layers for receiving said other signaling information of said virtual signaling channel in the same manner as said physical interface whereby said lowest one of said plurality of software layers responds as if said other signaling information of said virtual signaling channel was signaling information for said signaling channel of said other physical interface;

said virtual interface means further responsive to said other signaling information for transferring said other signaling information to said application means;

said application means further responsive to said other signaling information from said virtual interface means for converting said other signaling information of said virtual signaling channel into information for transmission by said user communication facilities said application means further responsive to the converted other signaling information of said virtual signaling channel for transferring said converted other signaling information to said lowest one of said plurality of software layers; and said lowest one of said plurality of software layers further responsive to said converted other information for communicating said converted other information to said physical interface for transmission by said user communication facilities.

27. A switching system comprising:

a first switching node interconnecting a second switching node and a third switching node;

means within said first switching node responsive to call setup requests from said second switching node to route calls to said third switching node for processing each of said call setup requests whereby said first switching node routes each of said calls through said first switching node and transmits another call setup request for each of said call setup requests from said second switching node to said third switching node so that said third switching node can respond to each of said calls;

means within said second switching node from transmitting a call setup request to said first switching node to set up a call to a predetermined endpoint within said third switching node whereby said third switching node processes said call request to said predetermined endpoint;

means within said second switching node responsive to transmission of said call setup request for said call to said predetermined endpoint and means within said third switching node responsive to receipt of said call to said predetermined endpoint for establishing a communication path through said first switching node from said second switching node to said third switching node for the communication of other calls without said first switching node processing call setup request for said other calls.

28. The switching system of claim 27 wherein said first switching node is interconnected to said second switching node and said third switching node by physical links with each physical link being terminated at each end by physical interfaces that are individually interconnected to one of said switching nodes and each of said physical interfaces having at least one signaling channel and a plurality of transport channels for communication of call information on the terminated physical link and each of said physical interfaces communicates control information on said signaling channel using a standard protocol to control calls on said transport channels including said call setup requests, said establishing means within said second switching node and said third switching node comprises:

means within said second switching node and said third switching node for assigning transport channels from said physical links interconnecting said second switching node and said third switching node via said first switching node to establish a virtual link to provide said communication path through said first switching node from said second switching node to said third switching node;

means within said second switching node and said third switching node for setting up a virtual signaling channel on said virtual link in accordance with said standard protocol;

means within said second switching node and said third switching node for identifying said assigned transport channels with said virtual signaling channel; and means within said second switching node and said third switching node for using said virtual signaling channel to communicate control information distinct from said control information of said signaling channel of physical link using said standard protocol to directly control calls on said assigned transport channels.

29. The switching system of claim 28 wherein said setting up means comprises means for establishing said virtual signaling channel using one of said assigned transport channels.

30. The switching system of claim 29 wherein said standard protocol is the ISDN protocol.

31. The switching system of claim 29 wherein said second switching node having a processor to control the operation of said second switching node and said processor having a plurality of software layers arranged in a hierarchical structure and said physical interface interconnecting said first switching node and said second switching node directly controlled by a lowest one of said plurality of software layers and said lowest one of said plurality of software layers responsive to control information received from said signaling channel of said physical interface to communicate said control information to another one of said plurality of software layers and said using means comprises an application means in a highest one of said plurality of software layers and an virtual interface means in said lowest one of said plurality of software layers;

said lowest one of said plurality of software layers further responsive to information received in the one of said assigned transport channels of said physical interface interconnecting said first switching node and said second switching node to communicate said information to said application means;

said application means responsive to said received information from said one of said assigned transport channels of said physical interface interconnecting said first switching node and said second switching node for converting that information into said control information of said virtual signaling channel;

said application means further responsive to said control information of said virtual signaling channel for transferring said control information of said virtual signaling channel to said virtual interface means;

said virtual interface means responsive to said control information of said virtual signaling channel for transferring said control information of said virtual signaling channel to said lowest one of said plurality of software layers in the same manner as said physical interface whereby said lowest one of said plurality of software layers responds as if said control information of said virtual signaling channel was control information from a signaling channel of another physical interface.

32. The switching system of claim 31 wherein said lowest one of said plurality of software layers further responsive to control information from said other one of said plurality of software layers designated for said signaling channel of said physical interface to communicate said control information on said signaling channel of said physical interface;

said virtual interface means responsive to other control information for said virtual signaling channel generated by said other one of said plurality of software layers and transferred via said lowest one of said plurality of software layers for receiving said other control information of said virtual signaling channel in the same manner as said physical interface whereby said lowest one of said plurality of software layers responds as if said other control information of said virtual signaling channel was control information for said signaling channel of said other physical interface;

said virtual interface means further responsive to said other control information for transferring said other control information to said application means;

said application means further responsive to said other control information from said virtual interface means for converting said other control information of said virtual signaling channel into information for transmission on said one of said assigned transport channels of said physical interface interconnecting said first switching node and said second switching node;

said application means further responsive to the converted other control information of said virtual signaling channel for transferring said converted other control information to said lowest one of said plurality of software layers; and said lowest one of said plurality of software layers further responsive to said converted other information for communicating said converted other information to said physical interface for transmission on said one of said assigned transport channels of said physical interface interconnecting said first switching node and said second switching node.

33. The switching system of claim 28 wherein said setting up means comprises means for establishing said virtual signaling channel utilizing user communication facilities of said standard protocol on a first signaling channel of said physical signaling channels interconnecting said second switching node to said first switching node and on a second signaling channel of said physical signaling channels interconnecting said third switching node to said first switching node, said first switching node transfers information on said communication facilities between said first and second physical signaling channels.

34. The switching system of claim 33 wherein said standard protocol is the ISDN protocol.

35. The switching system of claim 33 wherein said second switching node having a processor to control the operation of said second switching node and said processor having a plurality of software layers arranged in a hierarchical structure and said physical interface interconnecting said first switching node and said second switching node directly controlled by a lowest one of said plurality of software layers and said lowest one of said plurality of software layers responsive to signaling information received from said signaling channel of said physical interface to communicate said signaling information to another one of said plurality of software layers and said using means comprises an application means in a highest one of said plurality of software layers and an virtual interface means in said lowest one of said plurality of software layers;

said lowest one of said plurality of software layers further responsive to information received from said user communication facilities to communicate said information to said application means;

said application means responsive to said received information from said user communication facilities for converting that information into said signaling information of said virtual signaling channel;

said application means further responsive to said signaling information of said virtual signaling channel for transferring said signaling information of said virtual signaling channel to said virtual interface means;

said virtual interface means responsive to said signaling information of said virtual signaling channel for transferring said signaling information of said virtual signaling channel to said lowest one of said plurality of software layers in the same manner as said physical interface whereby said lowest one of said plurality of software layers responds as if said signaling information of said virtual signaling channel was signaling information from a signaling channel of another physical interface.

36. The switching system of claim 35 wherein said lowest one of said plurality of software layers further responsive to signaling information from said other one of said plurality of software layers designated for said signaling channel of said physical interface to communicate said signaling information on said signaling channel of said physical interface;

said virtual interface means responsive to other signaling information for said virtual signaling channel generated by said other one of said plurality of software layers and transferred via said lowest one of said plurality of software layers for receiving said other signaling information of said virtual signaling channel in the same manner as said physical interface whereby said lowest one of said plurality of software layers responds as if said other signaling information of said virtual signaling channel was signaling information for said signaling channel of said other physical interface;

said virtual interface means further responsive to said other signaling information for transferring said other signaling information to said application means;

said application means further responsive to said other signaling information from said virtual interface means for converting said other signaling information of said virtual signaling channel into information for transmission by said user communication facilities said application means further responsive to the converted other signaling information of said virtual signaling channel for transferring said converted other signaling information to said lowest one of said plurality of software layers; and said lowest one of said plurality of software layers further responsive to said converted other information for communicating said converted other information to said physical interface for transmission by said user communication facilities.

37. The switching system of claim 28 wherein said setting up means comprises means for establishing said virtual signaling channel utilizing a logical link of a first physical signaling channel of said physical signaling channels interconnecting said second switching node to said first switching node and a logical link of a second physical signaling channel of said physical signaling channels interconnecting said third switching node to said first switching node, said first switching node transfers information on said logical links between said first and second physical signaling channels.

38. The switching system of claim 37 wherein said standard protocol is the ISDN protocol.

39. The switching system of claim 37 wherein said second switching node having a processor to control the operation of said second switching node and said processor having a plurality of software layers arranged in a hierarchical structure and said physical interface interconnecting said first switching node and said second switching node directly controlled by a lowest one of said plurality of software layers and said lowest one of said plurality of software layers responsive to signaling information received from said signaling channel of said physical interface to communicate said signaling information to another one of said plurality of software layers and said using means comprises an application means in a highest one of said plurality of software layers and an virtual interface means in said lowest one of said plurality of software layers;

said lowest one of said plurality of software layers further responsive to information received from said user communication facilities to communicate said information to said application means;

said application means responsive to said received information from said user communication facilities for converting that information into said signaling information of said virtual signaling channel;

said application means further responsive to said signaling information of said virtual signaling channel for transferring said signaling information of said virtual signaling channel to said virtual interface means;

said virtual interface means responsive to said signaling information of said virtual signaling channel for transferring said signaling information of said virtual signaling channel to said lowest one of said plurality of software layers in the same manner as said physical interface whereby said lowest one of said plurality of software layers responds as if said signaling information of said virtual signaling channel was signaling information from a signaling channel of another physical interface.

40. The switching system of claim 39 wherein said lowest one of said plurality of software layers further responsive to signaling information from said other one of said plurality of software layers designated for said signaling channel of said physical interface to communicate said signaling information on said signaling channel of said physical interface;

said virtual interface means responsive to other signaling information for said virtual signaling channel generated by said other one of said plurality of software layers and transferred via said lowest one of said plurality of software layers for receiving said other signaling information of said virtual signaling channel in the same manner as said physical interface whereby said lowest one of said plurality of software layers responds as if said other signaling information of said virtual signaling channel was signaling information for said signaling channel of said other physical interface;

said virtual interface means further responsive to said other signaling information for transferring said other signaling information to said application means;

said application means further responsive to said other signaling information from said virtual interface means for converting said other signaling information of said virtual signaling channel into information for transmission by said user communication facilities;

said application means further responsive to the converted other signaling information of said virtual signaling channel for transferring said converted other signaling information to said lowest one of said plurality of software layers; and said lowest one of said plurality of software layers further responsive to said converted other information for communicating said converted other information to said physical interface for transmission by used user communication facilities.

41. A method for initiating a virtual link between a first and second switching nodes through a switching system, said method comprising the steps of:

establishing a plurality of physical transport channels between said switching nodes through said switching system utilizing a standard protocol on a physical signaling channel;

establishing a virtual signaling channel and a plurality of virtual transport channels via said physical channels; and identifyng said virtual signaling channel and said plurality of virtual transport channels to said switching nodes allowing calls to be set up on said virtual transport channels using said standard protocol on said virtual signaling channel without said physical signaling channel and said switching system being involved with the call setup of said calls.

42. The method of claim 41 wherein each of said switching nodes has a plurality of software layers and said virtual signaling channel establishing step comprises the step of receiving virtual signaling information communicated via one of said physical transport channels and transferring said virtual signaling information to said identifying step by an application software module at the highest software layer; and said identifying step comprises the step of transferring said virtual signaling information to higher software layers by simulating another physical signaling channel by a virtual interface software module at the lowest software layer in response to said transferred virtual signaling information.

43. The method of claim 42 further comprises the steps of transmitting information on said virtual signaling channel by transferring the transmit information to said virtual interface software module by said higher software layers;

accepting said transmit information by simulating said other physical signaling channel and transferring said transmit information to said application software module by said virtual interface in response to said transmit information; and communicating said transmit information out on said one of said transport channels as said virtual signaling channel by said application software module in response to said transmit information.

44. The method of claim 43 wherein said standard protocol is the ISDN protocol.

45. A method for initiating a virtual link between a first and second switching nodes through a switching system, said method comprising the steps of:
   establishing a plurality of physical transport channels between said switching nodes through said switching system utilizing a standard protocol on a physical signaling channel;
   establishing a plurality of virtual transport channels via said physical transport channels;
   establishing a virtual signaling channel using user communication facilities of said standard protocol on said physical signaling channel; and
   identifying said virtual signaling channel and said plurality of virtual transport channels allowing calls to be set up on said virtual transport channels by reusing said standard protocol on said virtual signaling channel without said switching system being involved with the call setup of said calls.

46. The method of claim 45 wherein each of said switching nodes has a plurality of software layers and said virtual signaling channel establishing step comprises the step of receiving virtual signaling information communicated by said user communication facilities and transferring said virtual signaling information to said identifying step by an application software module at the highest software layer; and
   said identifying step comprises the step of transferring said virtual signaling information to higher software layers by simulating another physical signaling channel by a virtual interface software module at the lowest software layer in response to said transferred virtual signaling information.

47. The method of claim 46 further comprises the steps of transmitting information on said virtual signaling channel by transferring the transmit information to said virtual interface software module by said higher software layers;
   accepting said transmit information by simulating said other physical signaling channel and transferring said transmit information to said application software module by said virtual interface in response to said transmit information; and
   communicating said transmit information out on said user communication facilities as said virtual signaling channel by said application software module in response to said transmit information.

48. The method of claim 47 wherein said standard protocol is the ISDN protocol.

49. A method for initiating a virtual link between a first and second switching nodes through a switching system, said method comprising the steps of:
   establishing a plurality of physical transport channels between said switching nodes through said switching system utilizing a standard protocol on a logical link of a physical signaling channel;
   establishing a plurality of virtual transport channels via said physical transport channels;
   establishing a virtual signaling channel on another logical link of said physical signaling channel; and
   identifying said virtual signaling channel and said plurality of virtual transport channels allowing calls to be set up on said virtual transport channels using said standard protocol on said virtual signaling channel without said logical link of said physical signaling channel and said switching system being involved with the call setup of said calls.

50. The method of claim 49 wherein each of said switching nodes has a plurality of software layers and said virtual signaling channel establishing step comprises the step of receiving virtual signaling information communicated via other one of said logical links and transferring said virtual signaling information to said identifying step by an application software module at the highest software layer; and
   said identifying step comprises the step of transferring said virtual signaling information to higher software layers by simulating another physical signaling channel by a virtual interface software module at the lowest software layer in response to said transferred virtual signaling information.

51. The method of claim 50 further comprises the steps of transmitting information on said virtual signaling channel by transferring the transmit information to said virtual interface software module by said higher software layers;
   accepting said transmit information by simulating said other physical signaling channel and transferring said transmit information to said application software module by said virtual interface in response to said transmit information; and
   communicating said transmit information out on said other one of said logical links as said virtual signaling channel by said application software module in response to said transmit information.

52. The method claim 51 wherein said standard protocol is the ISDN protocol.

* * * * *